(12) United States Patent
Reeve et al.

(10) Patent No.: US 8,768,558 B2
(45) Date of Patent: *Jul. 1, 2014

(54) OPTICAL TRACKING VEHICLE CONTROL SYSTEM AND METHOD

(71) Applicant: AgJunction LLC, Hiawatha, KS (US)

(72) Inventors: David R. Reeve, Chapel Hill (AU); Andrew John Macdonald, Graceville (AU); Campbell Robert Morrison, Corinda (AU)

(73) Assignee: AgJunction LLC, Hiawatha, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/573,682

(22) Filed: Oct. 3, 2012

(65) Prior Publication Data

US 2013/0041549 A1    Feb. 14, 2013

Related U.S. Application Data

(63) Continuation-in-part of application No. 12/504,779, filed on Jul. 17, 2009, now Pat. No. 8,311,696, and a continuation-in-part of application No. 12/947,620, filed on Nov. 16, 2010, now abandoned, which is a continuation of application No. 11/620,388, filed on Jan. 5, 2007, now Pat. No. 7,835,832.

(51) Int. Cl.
    *G05D 1/00* (2006.01)

(52) U.S. Cl.
    USPC ............... 701/28; 701/50; 701/470; 701/480; 701/514; 701/519; 342/357.26; 342/357.37

(58) Field of Classification Search
    USPC ............. 701/23, 25, 26, 28, 41, 50, 400, 408, 701/468–472, 479–480, 494–495, 510, 514, 701/519; 342/357.26, 357.37
    See application file for complete search history.

(56) References Cited

U.S. PATENT DOCUMENTS

| 4,769,700 A |   | 9/1988 | Pryor |
|---|---|---|---|
| 4,777,601 A | * | 10/1988 | Boegli ........................... 701/23 |
| 4,918,607 A |   | 4/1990 | Wible |
| 5,144,130 A | * | 9/1992 | Meyer et al. .................. 250/202 |

(Continued)

FOREIGN PATENT DOCUMENTS

WO    WO-2008080193    7/2008

*Primary Examiner* — Thomas Black
*Assistant Examiner* — Ce Li
(74) *Attorney, Agent, or Firm* — Law Office of Mark Brown, LLC; Mark E. Brown

(57) ABSTRACT

A vehicle control system having a controller and a spatial database adapted to provide spatial data to the controller at control speed. The spatial data provided from the spatial database to the controller includes images collected from an optical sensor subsystem in addition to other data collected by a variety of sensor types, including a GNSS or inertial measurement system. The spatial data received by the controller from the database forms at least part of the control inputs that the controller operates on to control the vehicle. The advantage provided by the present invention allows control system to "think" directly in terms of spatial location. A vehicle control system in accordance with one particular embodiment of the invention comprises a task path generator, a spatial database, at least one external spatial data receiver, a vehicle attitude compensation module, a position error generator, a controller, and actuators to control the vehicle.

17 Claims, 21 Drawing Sheets

(56) References Cited

U.S. PATENT DOCUMENTS

| | | | |
|---|---|---|---|
| 5,229,941 A * | 7/1993 | Hattori | 701/26 |
| 5,644,139 A | 7/1997 | Allen et al. | |
| 5,684,476 A | 11/1997 | Anderson | |
| 5,814,961 A * | 9/1998 | Imahashi | 318/587 |
| 5,848,485 A | 12/1998 | Anderson et al. | |
| 5,949,371 A | 9/1999 | Nichols | |
| 7,388,539 B2 * | 6/2008 | Whitehead et al. | 342/357.36 |
| 7,400,956 B1 * | 7/2008 | Feller et al. | 701/41 |
| 7,437,230 B2 * | 10/2008 | McClure et al. | 701/50 |
| 7,460,942 B2 * | 12/2008 | Mailer | 701/50 |
| 7,610,123 B2 | 10/2009 | Han et al. | |
| 7,623,952 B2 * | 11/2009 | Unruh et al. | 701/50 |
| 7,835,832 B2 * | 11/2010 | Macdonald et al. | 701/24 |
| 7,854,108 B2 | 12/2010 | Koselka et al. | |
| 7,885,745 B2 * | 2/2011 | McClure et al. | 701/50 |
| 8,098,324 B2 | 1/2012 | Ueno et al. | |
| 8,106,817 B2 | 1/2012 | Bhattacharya et al. | |
| 8,437,901 B2 | 5/2013 | Anderson | |
| 2002/0004691 A1 | 1/2002 | Kinashi et al. | |
| 2002/0165645 A1 * | 11/2002 | Kageyama | 701/1 |
| 2003/0208319 A1 * | 11/2003 | Ell et al. | 702/5 |
| 2004/0186644 A1 * | 9/2004 | McClure et al. | 701/50 |
| 2004/0221790 A1 * | 11/2004 | Sinclair et al. | 116/62.1 |
| 2005/0110676 A1 * | 5/2005 | Heppe et al. | 342/357.08 |
| 2005/0150160 A1 * | 7/2005 | Norgaard et al. | 47/58.1 SE |
| 2005/0196162 A1 * | 9/2005 | Mootz et al. | 396/428 |
| 2005/0259240 A1 * | 11/2005 | Goren | 356/28 |
| 2006/0095172 A1 * | 5/2006 | Abramovitch et al. | 701/28 |
| 2006/0213167 A1 | 9/2006 | Koselka et al. | |
| 2006/0290779 A1 * | 12/2006 | Reverte et al. | 348/84 |
| 2007/0069924 A1 * | 3/2007 | Goren | 340/988 |
| 2007/0193798 A1 | 8/2007 | Allard et al. | |
| 2007/0198185 A1 * | 8/2007 | McClure et al. | 701/213 |
| 2008/0039991 A1 | 2/2008 | May et al. | |
| 2008/0059068 A1 | 3/2008 | Strelow et al. | |
| 2008/0167770 A1 * | 7/2008 | Macdonald et al. | 701/24 |
| 2008/0269988 A1 * | 10/2008 | Feller et al. | 701/41 |
| 2008/0284643 A1 * | 11/2008 | Scherzinger et al. | 342/357.02 |
| 2008/0288205 A1 * | 11/2008 | Teoh et al. | 702/150 |
| 2009/0093959 A1 * | 4/2009 | Scherzinger et al. | 701/215 |
| 2009/0160951 A1 * | 6/2009 | Anderson et al. | 348/208.4 |
| 2009/0164067 A1 * | 6/2009 | Whitehead et al. | 701/41 |
| 2009/0175593 A1 | 7/2009 | Hayakawa | |
| 2009/0204281 A1 * | 8/2009 | McClure et al. | 701/25 |
| 2009/0251366 A1 * | 10/2009 | McClure et al. | 342/357.09 |
| 2010/0185364 A1 * | 7/2010 | McClure | 701/41 |
| 2010/0201829 A1 * | 8/2010 | Skoskiewicz et al. | 348/211.2 |
| 2010/0230198 A1 * | 9/2010 | Frank et al. | 180/169 |
| 2010/0312475 A1 | 12/2010 | Cheng | |
| 2012/0182421 A1 | 7/2012 | Asanov | |
| 2012/0251123 A1 | 10/2012 | Pederson | |
| 2012/0271540 A1 | 10/2012 | Miksa et al. | |
| 2012/0300070 A1 | 11/2012 | Ohtomo et al. | |
| 2013/0004086 A1 | 1/2013 | Carlbom et al. | |
| 2013/0041549 A1 | 2/2013 | Reeve et al. | |
| 2013/0046461 A1 | 2/2013 | Balloga | |
| 2013/0066542 A1 | 3/2013 | Chung | |
| 2013/0107034 A1 | 5/2013 | Di Bernardo et al. | |
| 2013/0121678 A1 | 5/2013 | Xin | |
| 2013/0141565 A1 | 6/2013 | Ling | |
| 2013/0147661 A1 | 6/2013 | Kangas et al. | |
| 2013/0156271 A1 | 6/2013 | Cimino | |
| 2013/0166103 A1 | 6/2013 | Ko | |
| 2013/0211715 A1 | 8/2013 | Bae et al. | |

* cited by examiner

OPTICAL TRACKING VEHICLE CONTROL SYSTEM AND METHOD

CROSS-REFERENCE TO RELATED APPLICATION

This application is a continuation-in-part of and claims the benefit of U.S. patent application Ser. No. 12/504,779, filed Jul. 17, 2009, and is a continuation-in-part of and claims the benefit of U.S. patent application Ser. No. 12/947,620, filed Nov. 16, 2010, which is continuation of and claims the benefit of U.S. patent application Ser. No. 11/620,388, filed Jan. 5, 2007, entitled "Vehicle Control System," now U.S. Pat. No. 7,835,832, issued Nov. 16, 2010, which are all incorporated herein by reference.

BACKGROUND OF THE INVENTION

1. Field of the Invention

The present invention relates to a control system for controlling the direction of travel of a vehicle, and in particular to a control system having an embedded spatial database using optical tracking for vehicle control and guidance. The control system of the present invention may also be used to control other aspects of a vehicle's motion, such as speed or acceleration. Furthermore, in the case of agricultural vehicles and the like, the present control system may be used to control yet other aspects of the vehicle's operation, such as the application of agricultural chemicals at desired locations (including at desired application rates), or the engagement and/or mode of operation of agricultural implements (e.g., plows, harvesters, etc.) at desired locations, etc.

For convenience, the invention will be described mainly with reference to agricultural vehicles and moving agricultural machinery. However, it will be clearly understood that the invention is not limited to agricultural applications and it may equally be applied to vehicles and other moving machinery in other areas.

2. Description of the Related Art

Automatic control of steering ("autosteering") of vehicles is becoming more widespread, especially in agricultural and mining applications. Most commercially available automatic steering systems include a controller that has means for determining, among other things, the position and heading of a vehicle, a computer-based system for comparing the position and heading of the vehicle with a desired position and heading, and a steering control responsive to a control signal issued by the controller when the position and/or heading of the vehicle deviates from the desired position and/or heading.

A number of control systems have previously been devised for controlling the steering of agricultural vehicles. These systems are generally used on vehicles such as tractors (including tractors with towed tools or other implements), harvesters, headers and the like which operate in large fields. These vehicles generally move along predetermined trajectories ("paths") throughout the field. In general, a wayline is entered into the control system and subsequent paths are calculated based on the wayline. If the vehicle deviates from the path as it moves, the controller causes the vehicle to steer back towards and onto the path as described below.

As the vehicle moves along the predetermined path trajectory, it uses various means such as signals produced by GPS (global positioning system) or INS (inertial navigation system) to identify if the vehicle deviates from the desired path trajectory. If the vehicle deviates, the extent of the deviation (i.e. the difference between the actual curvature of the vehicle's trajectory and the desired curvature, its actual compass heading compared with the desired compass heading, and the distance the vehicle is displaced laterally from the desired path) is expressed in the form of an error, and this error is fed back into the control system and used to steer the vehicle back onto the desired path.

A problem with previous vehicle control systems is that they are inherently "one-dimensional" or "linear" in nature. This means that, at a fundamental level, the controller operates by "knowing" the path that the vehicle is required to traverse, and "knowing" where the vehicle is located on that path (i.e. how far along the path the vehicle has moved) at a given time. However, the controller does not "know" where the vehicle is actually located in space. This is despite the fact that the controller may often progressively receive information containing the vehicle's spatial location, for example from the GPS/INS signals. In current controllers, the GPS/INS signals are used primarily to determine when the vehicle deviates from the path (i.e. to calculate the error) rather than for the primary purpose of determining the vehicle's actual position in space. Hence, at a fundamental level, the controller only "knows" the geometry of the path and how far the vehicle has moved along the path.

Therefore, with current controllers, if it is desired to know the actual spatial position of the vehicle, this must be calculated from the known geometry of the path and the known distance the vehicle has moved along that path. This calculation can be computationally expensive and difficult to implement in practice, particularly for curved, piecewise, broken or other complex path trajectories.

By way of example, it will be appreciated that one form of common path trajectory that agricultural vehicles are often required to traverse in fields is made up of a number of (usually parallel) path segments or "swaths" (these are sometimes also referred to as "rows"). Thus, the vehicle typically moves along one swath, harvesting or plowing as it goes, and it then turns around and moves back along an adjacent parallel swath, harvesting or plowing in the opposite direction. The adjacent swath will generally be spaced from the first swath sufficiently closely that no part of the field or crop is missed between the swaths, but also sufficiently apart so that there is not an unnecessary overlap region (i.e. a region between the swaths that gets plowed or harvested on both passes). In general, the distance between the mid-lines of each respective swath is determined with reference to the width of the vehicle (i.e. the width of the plow, harvester or possibly the tool being towed by the vehicle).

In cases where paths comprising a series of parallel swaths are used, the first swath will often be used as a reference swath or "wayline". In general, the geometry of the wayline in space will be entered into the control system along with the vehicle or implement width, and this is used to calculate the required spacing (and hence trajectory) for each of the adjacent parallel swaths. However, with most existing control systems, the controller is only able to control the steering of the vehicle as it proceeds along each of the swaths. It is much harder to control the steering of the vehicle as it turns around between one swath and the next. Therefore, whilst the spatial geometry of the respective swaths may have been calculated, from the control system's point of view at any given time it only "knows" that it is on the nth swath (numbered from the wayline) and that it has been moving along that swath for a known amount of time with known speed (i.e. it knows that the vehicle is a certain distance along the nth swath). However, at a fundamental level, the control system does not inherently know where the vehicle is consequently located in space or the spatial relationship between each swath. A graphical representation of the difference between the vehicle's actual spatial location and what the control system "sees" is given in FIG. 1.

The "one-dimensional" or "linear" nature of existing control systems also causes other difficulties. One example is in relation to obstacle avoidance. In most agricultural applications, the positions of obstacles (e.g., fences, trees, immovable rocks, creeks, etc.) are known according to their "real-world" spatial location. The spatial location may be known according to global latitude and longitude coordinates (e.g., as provided by GPS), or alternatively the location may be known relative to a fixed point of known location (this is generally a point in or near the field used to define the origin of a coordinate system for the field). However, as current control systems only recognize where the vehicle is located along the path, not where the vehicle is actually located in space, the control system itself is therefore unable to recognize whether the location of the obstacle coincides with the trajectory of the path, and hence whether there may be a collision.

Consequently, with current control systems, it may be necessary for a number of separate modules to be provided, in addition to the primary control module, if automatic obstacle avoidance (i.e. obstacle avoidance without the need for intervention by the driver of the vehicle) is to be achieved. In these cases, one of the modules would be a collision detection module for calculating the geometry and trajectory of a section of the path a short distance ahead of the vehicle in terms of "real world" spatial coordinates and for determining whether any of the points along that section of path will coincide with the location of an obstacle. If the collision detection module identifies that the section of path is likely to pass through an obstacle (meaning that there would be a collision if the vehicle continued along that path), then a further module may be required to determine an alternative trajectory for (at least) the section of the path proximate the obstacle. Yet a further module may then be required to determine how best to steer the vehicle from the alternative trajectory back onto the original path after the vehicle has moved past the obstacle. This multi-modular control system structure is complicated and can lead to computational inefficiencies because the different modules may each perform many of the same geometric calculations for their own respective purposes, separately from one another, leading to "doubling up" and unnecessary computation. Also, with this modular control system structure, control of the vehicle generally passes from one module to another as described above, but determining when one module should take over from another creates significant difficulties in terms of both system implementation and maintenance.

Another problem associated with the "one-dimensional" nature of existing control systems is their inherent inflexibility and unadaptability. For example, in practice, if the vehicle deviates from the desired path for some reason, it may be preferable for subsequent paths (swaths) to also include a similarly shaped deviation so that the paths remain substantially parallel along their length (or tangentially parallel and consistently spaced in the case of curved sections of path). If the vehicle is, for example, a harvester or a plow, then keeping the paths parallel in this way may help to prevent portions of the field from being missed, or from being harvested/plowed multiple times (by passing over the same portion of field on multiple passes). Even with the modular control system structures described above, it is often difficult to determine the geometry of the deviated path portion in terms of "real world" coordinates, and even if this can be done, it is also difficult to adjust subsequent path geometries to correspond to the deviation from the predetermined path trajectory that was originally entered.

As a further example of the inherent inflexibility and unadaptability of current "one-dimensional" control systems, it is illustrative to consider the situation where an obstacle is located near the end of one swath such that it would be quicker and more efficient to simply move on to an adjacent swath located nearby rather than wasting time trying to go around the obstacle to finish the first swath before moving on to the adjacent swath. Current "one-dimensional" control systems are not able to recognize that it would be more efficient to move on. This is because the control system only knows where the vehicle is along its current path (e.g., close to the end of the swath), and if a modular control systems is used, that module may also recognize that it is approaching the obstacle. The control system does not know where the vehicle is actually located in space, and therefore it cannot recognize that the beginning of the next swath is actually located nearby—it simply does not know where the next swath is (or indeed where the current swath is in space). Therefore, current control systems cannot easily recognize when it would be better to change paths (at least without intervention from the vehicle's driver), as this example illustrates. Nor is the current "one-dimensional" structure inherently adapted to enable the control systems to automatically (i.e. autonomously without assistance from the driver) determine and guide the vehicle along an efficient trajectory between swaths.

As used herein, "attitude" generally refers to the heading or orientation (pitch with respect to the Y axis, roll with respect to the X axis, and yaw with respect to the Z axis) of the vehicle, or of an implement associated with the vehicle. Other vehicle/implement-related parameters of interest include groundspeed or velocity and position. Position can be defined absolutely in relation to a geo-reference system, or relatively in relation to a fixed position at a known location, such as a base station. A change in one or both of the position and orientation of the vehicle (which can include a towed component, such as an implement or a trailer) can be considered a change in the vehicle's "pose." This includes changes (e.g., different order time derivatives) in attitude and/or position. Attitude and position are generally measured relatively with respect to a particular reference frame that is fixed relative to the area that the vehicle is operating in, or globally with respect to a geo-reference system.

U.S. Pat. No. 6,876,920, which is assigned to a common assignee herewith and incorporated herein by reference, describes a vehicle guidance apparatus for guiding a vehicle over a paddock or field along a number of paths, the paths being offset from each other by a predetermined distance. The vehicle guidance apparatus includes a GNSS receiver for periodically receiving data regarding the vehicle's location, and an inertial relative location determining means for generating relative location data along a current path during time periods between receipt of vehicle position data from the GNSS receiver. The apparatus also includes data entry means to enable the entry by an operator of an initial path and a desired offset distance between the paths. Processing means are arranged to generate a continuous guidance signal indicative of errors in the attitude and position of the vehicle relative to one of the paths, the attitude and position being determined by combining corrected GNSS vehicle location data with the relative location data from the inertial relative location determining means.

In the system described in U.S. Pat. No. 6,876,920, the inertial sensor is used to provide a higher data rate than that obtainable from GNSS alone. Although the inertial navigation system (INS) part of the steering control system suffers from errors, in particular a yaw bias, the signals received from the GNSS system are used to correct these errors. Thus, the combination of a GNSS based system and a relatively inexpensive INS navigation system allow for quite accurate control of the position of the vehicle. Although this system allows for accurate vehicle positioning and sound control of the vehicle's steering, difficulties may be experienced if there are prolonged periods of GNSS outage. GNSS outages may occur due to unsuitable weather conditions, the vehicle operating in an area where GNSS signals cannot be accessed, or due to problems with the GNSS receiver. If a period of prolonged GNSS outage occurs, the steering system relies solely upon the INS. Unfortunately, a yaw bias in a relatively inexpensive inertial sensor used in the commercial embodiment of that steering control system can result in errors being introduced into the steering of the vehicle.

Optical computer mice are widely used to control the position of a cursor on a computer screen. Optical computer mice incorporate an optoelectronic sensor that takes successive pictures of the surface on which the mouse operates. Most optical computer mice use a light source to illuminate the surface that is being tracked (i.e. the surface over which the mouse is moving). Changes between one frame and the next are processed using the image processing ability of the chip that is embedded in the mouse. A digital correlation algorithm is used so that the movement of the mouse is translated into corresponding movement of the mouse cursor on the computer screen.

The optical movement sensors used in optical computer mice have high processing capabilities. A number of commercially available optical computer mice include optical mouse sensors that can process successive images of the surface over which the mouse is moving at speeds in excess of 1500 frames per second. The mouse has a small light emitting source that bounces light off the surface and onto a complementary metal oxide semiconductor (CMOS) sensor. The CMOS sensor sends each image to a digital signal processor (DSP) for analysis. The DSP is able to detect patterns in images and see how those patterns have moved since the previous image. Based on the change in patterns over a sequence of images, the digital signal processor determines how far the mouse has moved in X and Y directions, and sends these corresponding distances to the computer. The computer moves the cursor on the screen based upon the coordinates received from the mouse. This happens hundreds to thousands of times each second, making the cursor appear to move very smoothly.

The chips incorporated into optical computer mice often include photodetectors and an embedded integrated circuit that is used to analyse the digital signals received from the photodetectors. The photodetectors may include an array of photosensors, such as an array of charged couple devices (CCDs).

U.S. Pat. No. 5,786,804 (incorporated herein by reference), which is assigned to Hewlett-Packard Company, describes a method and system for tracking attitude of a device. The system includes fixing a two-dimensional (2D) array of photosensors to the device and using the array to form a reference frame and a sample frame of images. The fields of view of the sample and reference frames largely overlap, so that there are common image features from frame to frame. Several frames are correlated with the reference frame to detect differences in location of the common features. Based upon detection of correlations of features, an attitudinal signal indicative of pitch, yaw and/or roll is generated. The attitudinal signal is used to manipulate a screen cursor of a display system, such as a remote interactive video system.

It will be clearly appreciated that any reference herein to background material or a prior publication is not to be understood as an admission that any background material, prior publication or combination thereof forms part of the common general knowledge in the field, or is otherwise admissible prior art, whether in Australia or any other country.

SUMMARY OF THE INVENTION

In a first aspect, the present invention provides a control system for controlling movement of a vehicle characterized in that the control system includes an optical movement sensor which scans a surface over which the vehicle is moving and generates a signal indicative of relative movement along an axis of the vehicle and relative movement across an axis of the vehicle, said signal being provided to a controller.

In a second aspect, the present invention provides a control system for controlling movement of a vehicle comprising a controller having a computer memory for storing or generating a desired path of travel, the controller being adapted to receive position and/or heading signals from one or more sensors, the position and/or heading signals enabling the controller to determine a position and/or heading of the vehicle relative to a desired path of travel, the controller sending control signals to a steering control mechanism in response to the determined position and/or heading of the vehicle, wherein the position and/or heading signals from the one or more sensors include a signal generated by an optical movement sensor configured to scan a surface during travel of the vehicle, the optical movement sensor generating a signal indicative of relative movement along an axis of the vehicle and relative movement across an axis of the vehicle.

The surface that is scanned by the optical movement sensor is suitably a surface over which the vehicle is travelling. Suitably, the optical movement sensor scans a surface that is close to or under the vehicle during travel of the vehicle over the surface.

The optical movement sensor may comprise the operative part of an optical computer mouse. Therefore, in saying that the optical movement sensor "scans" the surface over which the vehicle moves, where the optical movement sensor comprises the operative part of an optical computer mouse, it will be understood that the optical movement sensor receives successive images of the surface over which the vehicle is moving. One part or other of the control system will then detect patterns in the images, and uses the change in the patterns between successive images to obtain information regarding the movement of the vehicle.

The optical movement sensor may comprise an illumination source and an illumination detector. The optical movement sensor may comprise an optical movement sensor integrated circuit.

As noted above, the optical movement sensor may comprise the operative part from an optical computer mouse. Alternatively, the optical movement sensor may be adapted from or derived from the operative part of an optical computer mouse. The optical movement sensor may use a light source to illuminate the surface that is being tracked (i.e. the surface over which the vehicle is moving).

Changes between one frame and the next may be processed by an image processing part of a chip embedded in the optical movement sensor and this may translate the movement across the surface of the optical movement sensor (which will generally be mounted to the vehicle) into movement along two axes. Alternatively, the image processing may be performed by processing means separate from the optical movement sensor. For example, the signals received by the optical movement sensor may be conveyed to a separate microprocessor with graphics processing capabilities for processing.

The optical movement sensor may include an optical movement sensing circuit that tracks movement in a fashion similar to the optical movement sensing circuits used to track movement in computer mice. The person skilled in the art will readily appreciate how such optical movement sensing circuits analyze data and provide signals indicative of movement of the sensor across the surface. For this reason, further discussion as to the actual algorithms used in the optical movement sensing circuits need not be provided. Suitably, the optical movement sensing circuit may comprise an optical movement sensing integrated circuit. Such optical movement sensing integrated circuits are readily available from a number of suppliers.

In some embodiments, the control system of the present invention may further comprise one or more inertial sensors for providing further signals regarding the vehicle's attitude and position (or changes thereto) to the controller. Accelerometers and rate gyroscopes are examples of inertial sensors that may be used. The inertial sensors may form part of or comprise an inertial navigation system (INS), a dynamic measurement unit (DMU), an inertial sensor assembly (ISA), or an attitude heading reference system (AHRS). These are well-known to persons skilled in the art and need not be described further. The inertial sensors may be used in conjunction with other navigation sensors, such as magnetometers, or vehicle based sensors such as steering angle sensors, or wheel speed encoders.

Inertial sensors, such as rate gyroscopes and accelerometers, can suffer from time varying errors that can propagate through to create errors in the vehicle's calculated attitude and/or position. These errors can be sufficiently acute that to prevent providing the controller with significantly inaccurate measures of the vehicle's attitude and/or position, it is preferable (and often necessary) for the control system to also receive signals regarding the vehicle's attitude and/or position (or changes thereto) from a source that is independent of the inertial sensors. These separate signals can be used to compensate for the errors in the inertial sensor signals using known signal processing techniques.

It is common to use GNSS signals (which provide information regarding the vehicle's location) to compensate for the errors in the inertial sensor signals. However, the present invention opens up the possibility of providing a control system that includes the optical movement sensor and one or an assembly of inertial sensors (and possibly including one or more other vehicle sensors as well). In other words, in some embodiments of the present invention, the signals provided by the optical movement sensor may be used to compensate for the errors in the inertial sensor signals instead of or in addition to the GNSS signals.

In embodiments such as those described in the previous paragraph, a single optical movement sensor may generally be sufficient to compensate for the errors in inertial sensors, such as accelerometers which measure rates of change in linear displacement. However, a single optical movement sensor may not be sufficient to compensate for errors in inertial sensors, such as gyroscopes which measure rates of change in angular displacement because the optical movement sensor will often be fixedly mounted to the vehicle such that the orientation of the optical movement sensor is fixed to, and changes with, the orientation of the vehicle.

The single optical movement sensor of the kind used in optical computer mice is able to detect and measure movement of the optical movement sensor along the X (roll) and Y (pitch) axes (in the present context this means the X (roll) and Y (pitch) axes of the vehicle because the optical movement sensor is fixed to the vehicle). However, this kind of optical movement sensor is not generally able to detect and measure rotation about the Z (yaw) axis. Consequently, if it is desired to compensate for the XYZ errors in inertial sensors such as gyroscopes using optical movement sensors that are fixedly mounted to the vehicle, two or more optical movement sensors will generally need to be provided and mounted at different locations on the vehicle.

Alternatively, a single optical movement sensor can be used to compensate for the errors in gyroscopes and the like which measure rates of change in rotational displacement if the optical movement sensor is not fixed with respect to the vehicle. Rather, the optical movement sensor could be mounted so that when the vehicle turned (i.e. rotated about its Z (yaw) axis), the orientation of the optical movement sensor would remain unchanged. In effect, even if the vehicle turns, the orientation of the optical movement sensor would remain unchanged, meaning that the optical movement sensor would effectively translate but not rotate with respect to the surface over which the vehicle is moving. A single optical movement sensor might thus be used to compensate for the errors in both accelerometers and gyroscopes, but some system or mechanism (e.g., gimbal-mounting) would need to be provided to maintain the constant orientation of the optical movement sensor.

The embodiments of the invention described above where the control system incorporates one or more inertial sensors, one or more optical movement sensors, and where the optical movement sensor(s) are used (instead of GNSS signals) to compensate for the errors in the inertial sensor(s) can generally be described as relative measurement control systems. This is because the optical movement sensor(s) and the inertial sensor(s) can only measure changes in vehicle attitude and/or position. They are unable to fix the geographic position and attitude of the vehicle in absolute "global" coordinates. References in this document to relative movement of the vehicle, or of an implement associated with the vehicle, or relative attitude/position/heading/pose information should be understood in this context.

However, the relative coordinate system established by relative measurement control systems such as those described above can relate to absolute geographic space if the vehicle can be moved sequentially to at least two, and preferably three or more, locations whose absolute geographic locations are known. This leads to the possibility of calibrating a control system having only optical, inertial, and possibly other vehicle sensors, in the total absence of GNSS. For example, during power up (initialization), the inertial navigation system positions of the vehicle could be arbitrarily set on a map whose origin and orientation is known. To relate this map to absolute geographic space, the vehicle could be located at the first known location, the internal coordinates noted, then moved to a second location and the new internal coordinates likewise noted. The line between the two points could be fitted from the internal map onto the real world map to arrive at the XY offset between the two map origins, the orientation difference between the two map origins, and the linear scaling difference between the two maps.

Thus, in one embodiment, the present invention may comprise a control system including one or more optical movement sensors and one or more inertial sensors. Suitably, the control system may include one or more optical movement sensors and an assembly of inertial sensors. In one embodiment, the control system of the present invention may further comprise an assembly of sensors including accelerometers and rate gyroscopes for providing further position and/or attitude signals to the controller. The assembly may comprise between one and three sensor sets orthogonally mounted, with each sensor set comprising not necessarily one of each, but no more than one of each of the above-mentioned sensors. Such inertial sensors are well known to persons skilled in the art and need not be described further.

In another embodiment, the present invention may comprise a control system including one or more optical movement sensors and one or more other sensors. The other sensors may comprise navigation sensors such as magnetometers, or vehicle sensors such as wheel speed encoders, and steering angle encoders. Control systems in accordance with this embodiment of the invention would also be described as relative measurement control systems, and the relative coordinate system established by such a system can relate to absolute geographic space in generally the same way as described above.

In yet another embodiment, the control system of the present invention, which incorporates one or more optical movement sensors, may be integrated with a GNSS system. In this system, the GNSS system provides absolute measurement in geographic space and the optical movement sensor provides relative movement data that can be used to control the vehicle during periods of outage of GNSS signals or during periods of normal operation when no GNSS signals are being received. Thus, in a further embodiment, the present invention provides a control system including one or more optical movement sensors and a GNSS system.

In a further still embodiment, the control system of the present invention may incorporate one or more optical movement sensors, a GNSS system and one or more inertial sensors, suitably an assembly of inertial sensors. In this embodiment, the optical movement sensor is configured to look at the ground near or under the vehicle. The output signal generated by the optical movement sensor comprises the relative movement along the axis of the vehicle and the relative movement across the axis of the vehicle. This information can be used as an additional source for compensating for the errors in the inertial sensors, giving a combined GNSS/INS/optical movement sensor system with the capability of operating over sustained periods of GNSS outage. Thus, in another embodiment, the present invention that may provide a control system including one or more optical movement sensors, a GNSS system and one or more inertial sensors, such as an assembly of inertial sensors.

GPS (global positioning system) is the name of the satellite-based navigation system originally developed by the United States Department of Defence. GNSS (including GPS and other satellite-based navigation systems) is now used in a wide range of applications. A number of systems also exist for increasing the accuracy of the location readings obtained using GNSS receivers. Some of these systems operate by taking supplementary readings from additional satellites and using these supplementary readings to "correct" the original GNSS location readings. These systems are commonly referred to as "Satellite Based Augmentation Systems" (SBAS) and some examples of SBASs are: the United States' "Wide Area Augmentation System" (WAAS); the European Space Agency's "European Geostationary Navigation Overlay Service" (EGNOS); and the Japanese "Multi-Functional Transportation Satellite" (MFTS).

A number of "Ground Based Augmentation Systems" (GBASs) also exist which help to increase the accuracy of GNSS location readings by taking additional readings from beacons located at known locations on the ground. It will be understood that, throughout this specification, all references to GNSS include GNSS when augmented by supplementary systems such as SBASs, GBASs and the like.

In embodiments of the present invention where the optical movement sensor is used in combination with one or more other sensors, the datastream from the optical movement sensor may be combined with a datastream from another sensor. This may be done using known signal processing techniques to obtain a stream of statistically optimal estimates of the vehicle's current position and/or attitude. Suitably, the signal processing techniques may utilize a statistically optimized filter or estimator. The optimal filter or estimator could usefully, but not necessarily, comprise a Kalman filter.

The optical sensor used in the control system in accordance with the present invention may comprise an optical movement sensing integrated circuit that receives raw data from a lens assembly mounted on a vehicle or on an implement towed by a vehicle. The lens assembly may be configured such that an image of the ground immediately below the lens assembly is formed on a photosensor plane of the optical movement sensing integrated chip by the lens assembly. Usefully, the lens may be a telecentric lens. Furthermore, the lens may be an object space telecentric lens. An object space telecentric lens is one that achieves dimensional and geometric invariance of images within a range of different distances from the lens and across the whole field of view. Telecentric lenses will be known to those skilled in the art and therefore need not be described any further.

The lens assembly may be chosen so that the extent of the image on the optical movement sensing integrated chip represents a physical extent in the object plane which is commensurate with both the anticipated maximum speed of the vehicle and the processing rate of the optical movement sensing integrated circuit. For example, if the maximum speed of the vehicle is 5 m per second and the desired overlap of successive images is 99%, an image representing 0.5 m in extent will require a processing speed of 1000 frames per second.

The optical movement sensor may include an illumination source of sufficient power such that the image of the ground beneath the vehicle is rendered with optimum contrast. This can be usefully, but not necessarily implemented as an array of high intensity light emitting diodes chosen to emit light at the wavelength of optimal intensity of the optical movement sensor.

Desirably, the optical movement sensor may be provided with a mechanism to keep the entrance pupil of the optical assembly free of dust. This could be usefully implemented by means of a high velocity air curtain passing the entrance pupil. Other mechanisms may be used, such as those that spray a cleaning fluid over the pupil. The cleaning fluid in those embodiments may comprise a cleaning liquid, such as water. Other means or mechanisms suitable for keeping the lens, or at least the entrance pupil of the optical assembly, free of dust will be known to those skilled in the art and may also be used with the present invention.

In another embodiment, the present invention provides a control system for controlling a position of an implement associated with a vehicle, characterised in that the control system includes an optical movement sensor which scans a surface over which the implement is moving and generates a signal indicative of relative movement along an axis of the implement and relative movement across an axis of the implement, said signal being provided to a controller.

In another aspect, the present invention provides a control system for maintaining a position and/or heading (attitude) of an implement close to a desired path of travel, the control system comprising a controller having a computer memory for storing or generating the desired path of travel, the controller being adapted to receive position and/or heading signals relating to a position and/or heading of the implement from one or more sensors, the position and/or heading signals enabling the controller to determine the position and/or heading of the implement relative to the desired path of travel, the controller sending control signals to a position and/or heading control mechanism in response to the determined position and/or heading, wherein the position and/or heading signals from the one or more sensors include a signal generated by an optical movement sensor configured to scan a surface over which the implement is travelling, the optical movement sensor generating a signal indicative of relative movement along an axis of the vehicle and relative movement across an axis of the vehicle.

Suitably, in this aspect, the optical movement sensor is mounted to the implement. The optical movement sensor may scan the surface close to the implement or underneath the implement as the implement traverses the surface.

In this aspect, the control algorithms and the position control mechanisms may be as described in U.S. Pat. No. 7,460,942, which is assigned to a common assignee herewith and incorporated herein by reference. In embodiments of this aspect of the invention, the position of the implement may be controlled by controlling the steering of the vehicle associated with the implement (this is especially useful if the implement is rigidly and fixedly connected to the vehicle), or by moving the position of the implement (or at least a working part of the implement) relative to the vehicle, which may be achieved by adjusting the lateral offset between the working part of the implement and the vehicle, or by using the working part of the implement to "steer" the implement.

In this aspect, the control system may further include one more of a GNSS system and inertial sensors and navigation sensors and vehicle based sensors. These various systems and sensors are described above with reference to other aspects of the invention.

It is a further objective of the present invention to provide a vehicle control system having an embedded spatial database that may at least partially ameliorate one or more of the above-mentioned difficulties, or which may provide a useful or commercial alternative to existing control systems.

Accordingly, in a first broad form the present invention resides in a vehicle control system having a controller and a spatial database adapted to provide spatial data to the controller at control speed.

In another broad form, the invention resides in a control system for controlling a vehicle within a region to be traversed, the control system comprising: a spatial database containing spatial data; a controller adapted to receive spatial data from the spatial database at control speed; the control system being adapted to receive spatial data from the controller and/or an external source; and the controller using the spatial data for controlling the vehicle.

In a further broad form, a control system is provided for steering a vehicle within a region to be traversed, the control system comprising: a spatial database containing spatial data; a controller adapted to receive spatial data from the spatial database at control speed; the controller being adapted to control the steering of the vehicle, the spatial database being adapted to receive updated spatial data from the controller and/or an external source; and the updated spatial data relating to the vehicle and/or an implement associated with and proximate the vehicle and/or at least a portion of the region proximate the vehicle.

In agricultural applications, the region to be traversed by the vehicle will generally be the field that is to be plowed, harvested, etc., and the invention will be described generally with reference to agricultural vehicles operating in fields. However, no limitation is meant in this regard, and the region to be traversed by the vehicle may take a range of other forms in different applications. For example, in automotive applications the region to be traversed by the vehicle might comprise roadways located in a particular geographical area. Alternatively, in mining applications the region could comprise the vehicle navigable regions of the mine. In underground mining, this could include the various levels of the mine located vertically above and below one another at different relative levels (depths). Furthermore, the control system of the present invention could be applied to vehicles that operate on airport tarmacs, in which case the region to be traversed by the vehicle might be the tarmac, or a portion thereof. From these examples, the person skilled in the art will appreciate the breadth of other applications that are possible.

The control system of the present invention includes a spatial database that contains spatial data. The spatial database may also be adapted to receive spatial data including updated spatial data, and to provide spatial data to other components of the control system. In general, data may be characterized as "spatial" if it has some relationship or association with "real world" geographical location, or if it is stored somehow with reference to geographical location. Some illustrative examples of the kinds of spatial data that may be stored within the database include (but are not limited to) coordinate points describing the location of an object (e.g., a rock or tree) in terms of the object's "real world" geographical location in a field, the coordinate points for a geographical location itself, information regarding a "state" of the vehicle (e.g., its speed, "pose" (position and orientation) or even fuel level) at a particular geographical location, a time when the vehicle was at a particular geographical location, or a command to the vehicle to change its trajectory or mode of equipment (e.g., plow) operation if or when it reaches a certain geographical location. These examples illustrate that any data or information that has an association with geographical location, or which is stored with reference to geographical location, can constitute "spatial data". For the remainder of this specification, the terms "spatial data" and "spatial information" will be used interchangeably. References simply to "data" or "information" will generally also carry a similar meaning, and references simply to the "database" will be to the spatial database, unless the context requires otherwise. Typically, the spatial database is an electronic database stored in a memory device, such as, for example, a RAM, as discussed in more detail below.

Spatial data may be stored within the database according to any convenient coordinate system, including (but not limited to) cartesian (or projected) coordinates, polar coordinates, cylindrical coordinates, spherical coordinates, latitude/longitude/altitude etc. The coordinate system may also be "global" in the sense of the location references provided by GPS, or "local" coordinates such as those defined with respect to a local origin and reference orientation. The coordinates may or may not take into account the curvature caused by the Earth's overall spherical shape. Hence, there is no limitation as to the coordinate system that may be used with the present invention, although it is envisaged that Cartesian (x,y or x,y,z) coordinates or latitude/longitude/altitude will be used most frequently because of the way these inherently lend themselves to describing geographical location, and because of the ease with which these coordinate systems can be implemented digitally. Particularly representative embodiments may utilize the WGS84 datum which is consistent with the current GPS.

Those skilled in the art will know that GPS (global positioning system) is the name of the satellite based navigation system originally developed by the United States Department of Defense. GPS is now used in a wide range of applications. A number of systems also exist for increasing the accuracy of the location readings obtained using GPS receivers. Some of these systems operated by taking supplementary readings from additional satellites and using these supplementary readings to "correct" the original GPS location readings. These systems are commonly referred to as "Satellite Based Augmentation Systems" (SBAS) and some examples of SBASs are: the United States' "Wide Area Augmentation System" (WAAS); the European Space Agency's "European Geostationary Navigation Overlay Service" (EGNOS); and the Japanese' "Multi-Functional Transportation Satellite" (MFTS).

A number of "Ground Based Augmentation Systems" (GBASs) also exist which help to increase the accuracy of GPS location readings by taking additional readings from beacons located at known locations on the ground. It will be understood that, throughout this specification, all references to GPS include GPS when augmented by supplementary systems such as SBASs, GBASs and the like.

It is explained above that the controller (which controls the vehicle) receives spatial data from the spatial database. In this way, the data received by the controller from the database forms at least part of the control inputs that the controller operates on to control the vehicle (i.e. the spatial data forms at least part of the inputs that drive the controller). The fact that the controller operates directly on information that is inherently associated with "real world" geographic location represents a change in thinking compared with existing vehicle control systems. In particular, it means that the control system of the present invention "thinks" directly in terms of spatial location. Put another way, in the control system of the present invention, control parameters are defined in geographic space rather than the space of an abstract vector. Consequently, the controller of the present invention may be considered to be inherently "multi-dimensional" or "spatial" in nature, as opposed to "one-dimensional" or "linear" like the existing control systems described in the background section above.

It is envisaged that at least some (and probably most) of the components of the control system, including the controller, will typically be implemented using commercially available equipment and a generally conventional control architecture. For instance, the controller may be implemented using equipment that provides memory and a central processing unit to run the one or more algorithms required to control the vehicle. Likewise, the controller (and hence the control algorithm(s)) used in the present invention may take any form suitable for controlling the steering of a vehicle. Typically, closed loop or feedback type control will be used at least in relation to some signal streams (i.e. in relation to at least some of the vehicle variables being controlled by the controller). However, open loop control may also be used, as may feed-forward control structures wherein the spatial data received by the controller from the spatial database is fed forward to form part of the control outputs used to control the vehicle. Where feedback type control is used, the control structure may incorporate combinations of proportional, integral and differential control, or a series of such (possibly nested) control loops. However, no particular limitation is meant in this regard and the person skilled in the art will appreciate that any form of suitable control and/or controller may be used.

The control system may also incorporate conventional signal processing and transmitting equipment, for example, for suitably filtering incoming spatial data signals, and for transmitting control signals from the controller to the vehicle's steering system to steer the vehicle. The person skilled in the art will appreciate that any suitable electric, mechanical, pneumatic or hydraulic actuators, or combinations thereof, may be used with the present invention. The actuators may be linked with the vehicle's steering and drive systems to control the steering, acceleration, deceleration, etc. of the vehicle in response to control signals produced by the controller. Associated equipment such as amplifiers and power sources may also be provided as required to amplify the control signals, and to power the actuators. A wide range of power sources may be used including batteries, generators, pumps, etc., depending on the nature of the actuator(s) and the signals to be amplified.

Whilst the present control system may operate using a conventional form of controller and using at least some commercially available equipment, the spatial database used to store the spatial data and to provide the spatial data to the controller may be different to other forms of databases used in other areas. In other areas (including non-control related applications such as those where data storage is the principal objective), databases often contain the vast amounts of information (in this case "information" is not used in its "spatial" sense) and the information is generally stored in complex hierarchical structures. Conceptually, these databases may be considered to be "multi-levelled" in that an initial query may return only relatively superficial level information, but this may in turn allow the user to interrogate the database more deeply to obtain more specific, linked or related information. This complex structure means that these kinds of databases can take considerable time (many seconds, minutes or even longer) to generate the appropriate output in response to a query. Those skilled in the art will appreciate that databases such as these, which take a relatively long time to return information in response to a query, may not be suitable for use in control systems such as the present which require low latencies between variable inputs and control outputs to thereby enable real-time control to be provided.

The spatial database used in the present invention will suitably be adapted to provide the data to the controller at control speed. In this sense, "control speed" means that the database is able to provide the information at a rate of the same order as the speed at which the controller repeats successive cycles of the control algorithm (i.e. at a rate of the same order as the "clock speed" of the controller). Ideally, the database will be adapted to provide the data to the controller, and perhaps also receive data from the controller and/or external sources, at every successive cycle of the control algorithm (i.e. at the controller's clock speed). However, in some embodiments it may be sufficient for the database to be adapted to provide (and perhaps receive) data at less than, but close to, the controller's clock speed (for example, at every second or third successive cycle of the control algorithm), provided that the rate is fast enough to provide the controller with sufficiently up-to-date spatial information to achieve adequate vehicle control performance. In cases where the controller operates at different clock speeds for different data signal streams, the database may be adapted to provide data at a rate of the same order as one of those controller clock speeds. In any event, the database should provide data to the controller at a rate commensurate with the control loop bandwidth.

In practice, it is envisaged that the database may be adapted to provide data to the controller at a rate of between 1 Hz and 100 Hz. Given the speeds that vehicles such as agricultural vehicles typically move at (generally less than 60 km/hr or 37.3 miles/hr), rates between 1 Hz and 20 Hz will almost always be sufficient, and even rates between 3 Hz and 12 Hz may be sufficient for vehicles moving at significantly less than 60 km/hr. Nevertheless, those skilled in the art will recognize that the necessary or achievable rates may vary depending on the level of control precision and performance required in different applications, the speed at which the vehicle in question moves, and the capabilities of the available equipment used to implement the control system.

Those skilled in the art will appreciate that because the spatial database used in the present invention can provide spatial data to the controller at control speed, and therefore forms part of the system's overall configuration, the spatial database may be considered to be "embedded" within the control system, rather than external to it. This is particularly so in embodiments where feedback type control is used, and the spatial database forms part of the system's overall closed loop structure (i.e. in embodiments where the spatial database forms part of the loop).

In order for the database to be able to provide (and, if desired, also receive) data at the required rates, the form of the database should allow the required rapid database access and response times. Ideally, the database and all of the data that it contains will be loaded into the control system's memory (i.e. loaded into RAM). This way, the data will be directly accessible by the controller's CPU (central processing unit), rather than requiring a query to be sent to a remote disk or storage device containing the data, the response to which would then need to be loaded into RAM before being accessible by the CPU. However, it is possible that the database could be located on a separate disk or other storage device, particularly if the device is capable of retrieving data in response to a query with sufficient speed such as, for example, a disk device with RAM read/write cache.

It is envisaged that the amount of memory required to store the spatial data relating to a particular field to be traversed by the vehicle may be in the order of megabytes. By way of example (given for illustrative purposes only), consider a straight wayline that is 1 km long and which has 500 parallel swaths of corresponding length. If the database is designed to incorporate information pertaining to locations every 2 m along each of the 500 swaths, this corresponds to 501.times.500=250,500 locations. When the data is structured within the database in the manner described further below, this may correspond to approximately 4 MB of memory required to store the coordinates of each point. However, it is also envisaged that as the nature and complexity of the data required to be stored in the database increases, the required amount of memory may increase to hundreds of megabytes or gigabytes. Devices which provide this amount of memory are (or are at least becoming) commercially available.

The speed of the database may be assisted by the way in which the data is arranged (i.e. stored) within the database. A wide range of methods and algorithms are known for arranging data (i.e. for assigning appropriate "indices" and the corresponding memory allocations to individual items of data) within databases, and the particular method chosen depends on the nature of the data, and the way and speed with which the database is to respond to a query. For the complex hierarchical "multi-leveled" databases described above, the data should be arranged so as to enable the database to collate and deliver all relevant information relating to a complex query. However, as explained above, the requirement for those databases to be able to process complex queries leads to potentially long lag times which may be undesirable in the context of vehicle control applications. Therefore, the spatial database used in the present invention can store data in a "single-level" or "flat" structure according to the geographical location that particular items of data relate to.

Some algorithms which could be used to arrange the spatial data within the database include the algorithms commonly referred to by the names "Grid-indexing", "Quadtree" or "R-tree". However, in other embodiments of the invention data may be arranged within the database using a form of algorithm that will be referred to as a "spatial hash-key" algorithm. A spatial hash-key algorithm maps physical locations (based on their "real world" coordinates) into one-dimensional "hash-keys". The "hash-key" for each location is a string of characters that can be stored in the database's hash table and retrieved in response to a query.

Properties of the spatial hash-key algorithm may include: points which are close to each other in the real world should have closely related hash keys (i.e. the algorithm should maintain "locality"), the algorithm should operate using whatever coordinate system the control system uses to represent the region, the algorithm should be adapted for digital implementation (hence, it should be adapted to operate using integer or floating-point numbers, preferably with 64-bit "double" precision or better) the algorithm should be fast to compute.

It is explained above that the control system of the present invention, and ideally the spatial database, may be adapted to receive updated data from the controller and/or an external source. The spatial database can be adapted to receive the updated information at control speed. Data received from the controller may include or may be used to generate, for example, estimates of the vehicle's predicted state (i.e. its speed, position, orientation, etc.) at an upcoming location based on its current instantaneous state at a particular location. The external sources may include GPS, INS, or any other inertial, visual or other system used for obtaining information relating to the state of the vehicle or other aspects of the region (such as obstacles close to the vehicle). Data received in this way may be (at least initially) recorded in its unprocessed or "raw" form in the database. This unprocessed data may be fed directly back into the controller, or the respective streams of incoming data (possibly relating to disparate variables) may be filtered using a Kalman filter or some other similar digital signal processing technique to obtain a statistically optimized estimate of the state of the vehicle and its proximate surroundings as it travels. This optimized estimate of the vehicle's state at a particular location may then be fed into the controller. The use of statistically optimized estimates and data may help to improve control performance.

According to a further broad form, the invention resides in a closed loop vehicle control system comprising: a spatial database; a controller adapted to receive spatial data from the spatial database at control speed, the controller controlling the steering of the vehicle; wherein updated spatial data is fed back into the control system.

In yet another broad form, the invention resides in a method for controlling a vehicle comprising: entering spatial data relating to a region to be traversed by the vehicle into a spatial database; providing spatial data from the spatial database to a controller at control speed to control the vehicle as the vehicle traverses the region; and entering updated spatial data into the spatial database as the vehicle traverses the region.

In yet a further broad form, the invention resides in a vehicle control system comprising: a spatial database; a controller adapted to receive spatial data from the spatial database; and the controller using the spatial data from the spatial database to control the steering of the vehicle.

It will be appreciated that all preferred features and aspects of the invention described with particular reference to one or other broad form of the invention, may also apply equally to all other forms of the invention, unless the context dictates otherwise.

BRIEF DESCRIPTION OF THE DRAWINGS

Certain embodiments, aspects and features of the invention will now be described and explained by way of example and with reference to the drawings. However, it will be clearly appreciated that these descriptions and examples are provided to assist in understanding the invention only, and the invention is not limited to or by any of the embodiments, aspects or features described or exemplified.

DETAILED DESCRIPTION OF THE PREFERRED EMBODIMENTS

1. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Global navigation satellite systems (GNSS) are broadly defined to include GPS (U.S.), Galileo (Europe, proposed), GLONASS (Russia), Beidou (China), Compass (China, proposed), IRNSS (India, proposed), QZSS (Japan, proposed) and other current and future positioning technology using signals from satellites, using single or multiple antennae, with or without augmentation from terrestrial sources. Inertial navigation systems (INS) include gyroscopic (gyro) sensors, accelerometers and similar technologies for providing output corresponding to the inertia of moving components in all axes, i.e. through six degrees of freedom (positive and negative directions along longitudinal X, transverse Y and vertical Z axes). Yaw, pitch and roll refer to moving component rotation about the Z, Y and X axes respectively. Said terminology will include the words specifically mentioned, derivatives thereof and words of similar meaning.

2. Optical Vehicle Control System 2

Figure 1A:
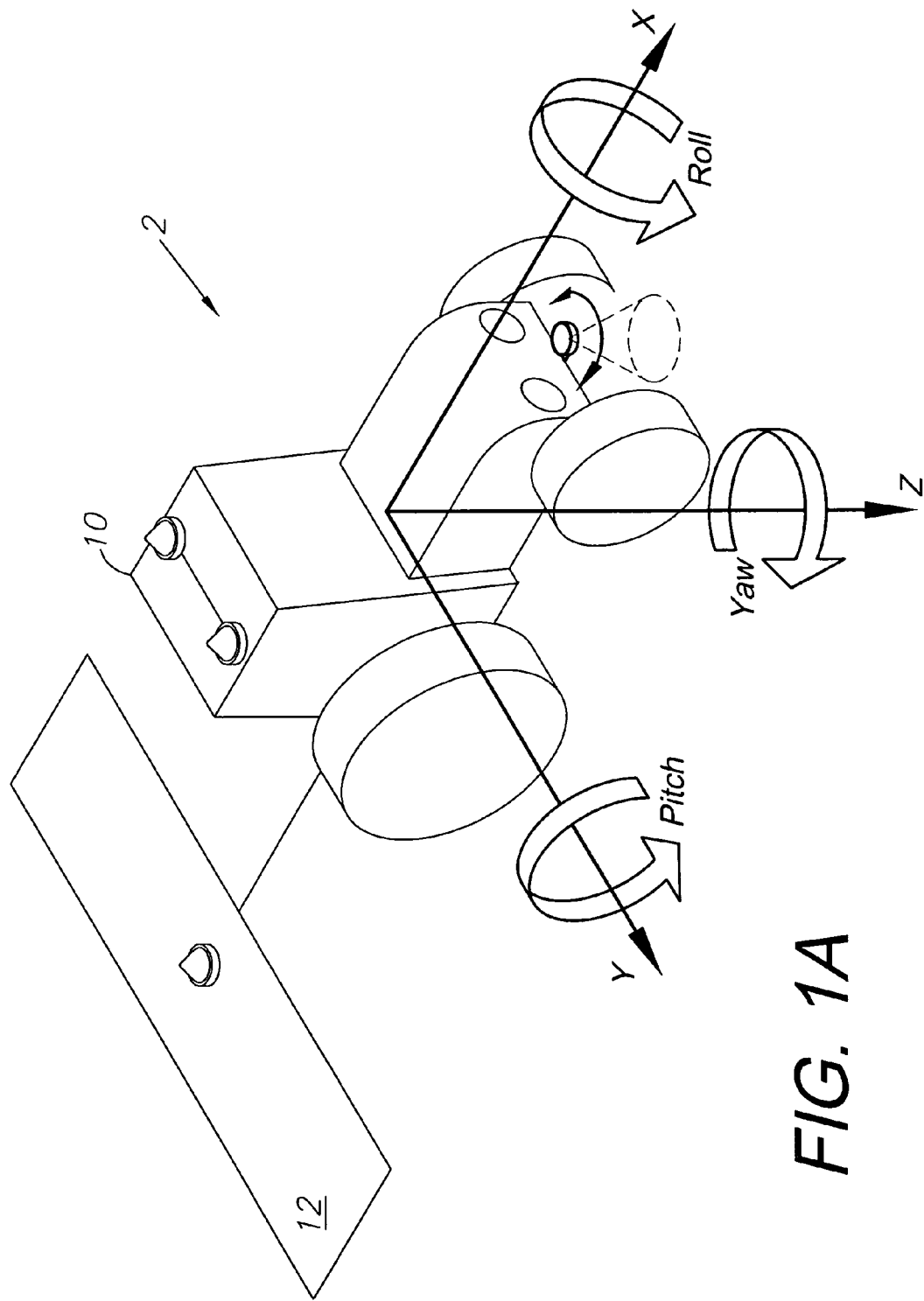
FIG. 1A shows a vehicle comprising a tractor and an implement fitted with an optical tracking control system in accordance with one embodiment of the present invention, and further shows XYZ axial attitude orientations.
Figure 1B:
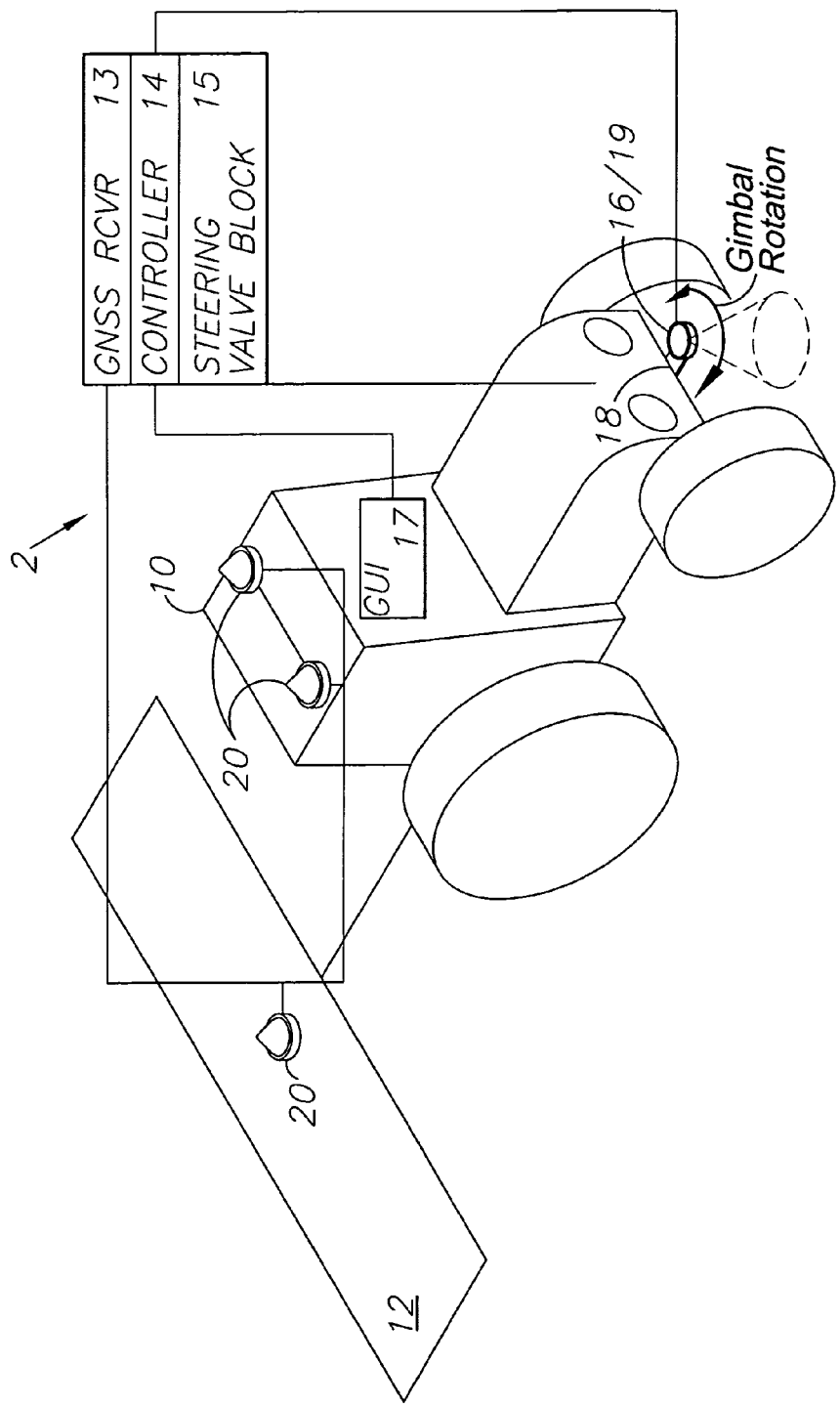
FIG. 1B shows the vehicle with a block diagram of the control system.

FIGS. 1A and 1B show a tractor 10 fitted with an optical movement sensor 16 in accordance with an embodiment of the present invention. The tractor 10 is towing an agricultural implement, such as a plow, sprayer, cultivator, etc. 12.

The tractor 10 is fitted with a steering control system. The steering control system includes a controller 14 and a steering valve block 15. The controller 14 suitably includes a computer memory that is capable of having an initial path of travel entered therein. The computer memory is also adapted to store or generate a desired path of travel. The controller 14 receives position and attitude signals from one or more sensors (to be described later) and the data received from the sensors are used by the controller 14 to determine or calculate the position and attitude of the tractor. The controller 14 then compares the position and attitude of the tractor with the desired position and attitude of the tractor. If the determined or calculated position and attitude of the tractor deviates from the desired position and attitude of the tractor, the controller 14 issues a steering correction signal that interacts with a steering control mechanism. In response to the steering correction signal, the steering control mechanism makes adjustments to the angle of steering of the tractor, to thereby assist in moving the tractor back towards the desired path of travel. The steering control mechanism may comprise one or more mechanical or electrical controllers or devices that can automatically adjust the steering angle of the vehicle. These devices may act upon the steering pump, the steering column or steering linkages.

In one embodiment of the present invention, the steering control algorithm may be similar to that described in our U.S. Pat. No. 6,876,920, which is incorporated herein by reference and discloses a steering control algorithm, which involves entering an initial path of travel (often referred to as a way-line). The computer in the controller 14 then determines or calculates the desired path of travel, for example, by determining the offset of the implement being towed by the tractor and generating a series of parallel paths spaced apart from each other by the offset of the implement. This ensures that an optimal working of the field is obtained. The vehicle then commences moving along the desired path of travel. One or more sensors provide position and attitude signals to the controller and the controller uses those position and attitude signals to determine or calculate the position and attitude of the vehicle. This position and attitude is then compared with the desired position and attitude of the vehicle. If the vehicle is spaced away from the desired path of travel, or is pointing away from the desired path, the controller generates a steering correction signal. The steering correction signal may be generated, for example, by using the difference between the determined position and attitude of the vehicle and the desired position and attitude of the vehicle to generate an error signal, with the magnitude of the error signal being dependent upon the difference between the determined position and attitude and the desired position and attitude of the vehicle. The error signal may take the form of a curvature demand signal that acts to steer the vehicle back onto the desired path of travel. Steering angle sensors in the steering control mechanism may monitor the angle of the steering wheels of the tractor and send the data back to the controller to thereby allow the controller to correct for understeering or oversteering.

In an alternative embodiment, the error signal may result in generation of a steering guidance arrow on a visual display unit to thereby enable the driver of the vehicle to properly steer the vehicle back onto the desired path of travel. This manual control indicator may also be provided in conjunction with the steering controls as described in paragraph above.

It will be appreciated that the invention is by no means limited to the particular algorithm described, and that a wide variety of other steering control algorithms may also be used.

In general terms, most, if not all, steering control algorithms operate by comparing a determined or calculated position and attitude of the vehicle with a desired position and attitude of the vehicle. The desired position and attitude of the vehicle is typically determined from the path of travel that is entered into, or stored in, or generated by, the controller. The determined or calculated position and attitude of the vehicle is, in most, if not all, cases determined by having input data from one or more sensors being used to determine or calculate the position and attitude of the vehicle. In U.S. Pat. No. 6,876,920, GNSS sensors, accelerometers, wheel angle sensors and gyroscopes are used as the sensors in preferred embodiments of that patent.

Returning now to FIGS. 1A and 1B, the tractor 10 is fitted with a controller 14. The controller 14 includes a graphic user interface (GUI) 17 mounted in the cab of the tractor 10 for inputting data to the controller 14 and a display screen. The GUI 17 can comprise any means for entering data into the controller 14, for example a touchscreen, keyboard or keypad for manually entering data, or a cable/wireless connection for transferring data to the controller 14. The GUI 17 also includes a display screen, and can include various other output devices such as LEDs, audio, printers, hardwired and wireless output connections, etc. The controller 14 also includes a computer memory for receiving and storing data, a CPU for processing data and a control signal generator for generating control signals to the steering control mechanism. The controller 14 may also include random access memory (RAM), read only memory (ROM), and an optical disc drive such as a DVD drive or a CD drive for receiving optical disks and reading information therefrom. The controller 14 may be pre-programmed with software that allows for calculation of the desired path of travel. Alternatively, software may be loaded onto the controller from a recorded media carrier, such as a DVD disc, a CD disc, a floppy disk or the like. Appropriate software may be downloaded from a network.

The actual details of the controller will be readily understood by persons skilled in the art and need not be described further.

Figure 9:
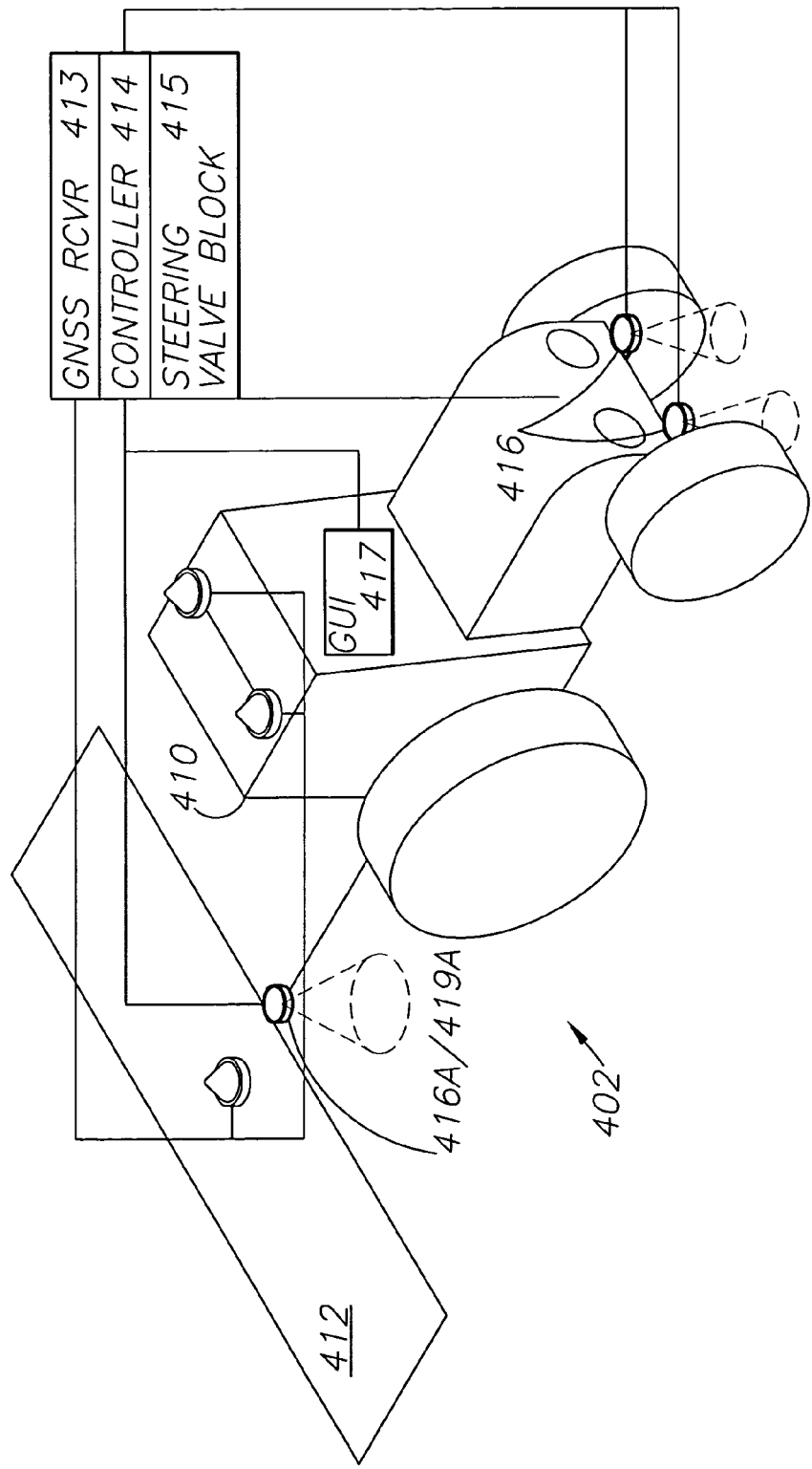
FIG. 9 shows a schematic view of an embodiment of the present invention in which the position of an implement is optically tracked.

The tractor 10 shown in FIGS. 1A and 1B is also fitted with an optical movement sensor 16. The optical movement sensor 16 is fitted to an arm 18 extending forwardly from the front of the tractor 10. This is so that the optical movement sensor 16 is ahead of the wheels to minimize the effect of dust kicked up by the wheels. However, it will be appreciated that the optical movement sensor 16 may be positioned at a side of the tractor or at a rear part of the tractor, or even underneath the tractor. The basic requirement for the optical movement sensor positioning and mounting is that the optical movement sensor can emit radiation, typically light, onto the ground and receive reflected radiation or light from the ground. Provided that this basic requirement is met, the optical movement sensor may be mounted anywhere on the tractor. Indeed, the optical movement sensor may even be mounted on the implement 12 (FIG. 9).

In the embodiment shown in FIGS. 1A and 1B, the optical movement sensor 16 is "gimballed", meaning that its orientation with respect to the tractor may change. This "gimballed" embodiment is described further below.

The optical tracking movement sensor 16 may comprise the operative part of an optical computer mouse. Optical computer mice incorporate an optoelectronics sensor that takes successive pictures of the surface on which the mouse operates. Most optical computer mice use a light source to illuminate the surface that is being tracked. Changes between one frame and the next are processed by an image processing part of a chip embedded in the mouse and this translates the movement of the mouse into movement on two axes using a digital correlation algorithm. The optical movement sensor 16 may include an illumination source for emitting light therefrom. The illumination source may comprise one or more LEDs. The optical movement sensor may also include an illumination detector for detecting light reflected from the ground or the surface over which the vehicle is travelling. Appropriate optical components, such as a lens (preferably a telecentric lens), may be utilized to properly focus the emitted or detected light. A cleaning system, such as a stream of air or other cleaning fluid, may be used to keep the optical path clean. The optical movement sensor 16 may comprise a charge coupled device (CCD) or a complementary metal oxide semiconductor (CMOS) sensor. The optical movement sensor 16 may also include an integrated chip that can rapidly determine the relative movement along an axis of the vehicle and the relative movement across an axis of the vehicle by analysing successive frames captured by the illumination detector. The optical movement sensor can complete hundreds to thousands of calculations per second.

The optical movement sensor 16 generates signals that are indicative of the relative movement of the vehicle along the vehicle's axis and the relative movement of the vehicle across the vehicle's axis. The signals are sent to the controller 14. The signals received by the controller 14 are used to progressively calculate or determine changes in the position and attitude of the vehicle. In the embodiment shown in FIGS. 1A and 1B, the controller 14 may include a clock that can be used to determine a time of travel of the vehicle and use that time of travel and possibly other input variables (such as the speed of the vehicle), together with the signals generated by the optical movement sensor, to calculate or determine the position and attitude of the vehicle This may then be compared to the desired position and attitude of the vehicle arising from the desired path of travel stored in or generated by the controller 14. If there are any discrepancies between the calculated or determined position and attitude of the vehicle and the desired position and attitude of the vehicle, a steering correction signal is sent from the controller 14 to the steering (valve block) control mechanism. Examples of such automatic steering control mechanisms are disclosed in U.S. Pat. No. 7,142,956; No. 7,277,792; No. 7,400,956; and No. 7,437,230, all of which are assigned to a common assignee with the present application and are incorporated herein by reference.

Only one optical movement sensor 16 is illustrated in FIGS. 1A and 1B. However, as described above, if the optical movement sensor 16 is the kind used in optical computer mice, and if the optical movement sensor 16 is fixed with respect to the vehicle, the optical movement sensor will generally only measure movement along and across the principal axis of the vehicle (i.e. along the longitudinal roll X axis and along the transverse pitch Y axis). Fixed optical movement sensors of this kind generally do not measure rotation about the yaw Z axis. A single optical movement sensor 16 could be used to measure change in the vehicle's orientation with respect to its yaw Z axis (in addition to measuring changes in the movement of the vehicle along the roll X and pitch Y axes), if the optical movement sensor 16 is mounted in a gimbal mount 19, which can be controlled with input from a compass (GNSS, magnetic, etc.) and/or a gyroscope. In this context, "gimballed" means that the optical movement sensor 16 is mounted to the vehicle in a dynamically pivotable manner so that the orientation of the optical movement sensor (at least about its yaw Z axis) remains the same even if the orientation of the vehicle about its yaw Z axis changes. In other words, so that the optical movement sensor orients itself in a similar way to a compass needle (which stays in one orientation even if the compass is rotated). It will be appreciated from the explanations given above that if a single optical movement sensor is mounted to the vehicle in "gimballed" manner, the optical movement sensor will effectively translate, but not rotate, as the vehicle moves and turns. In order to achieve "gimballed" mounting, a gimbal device or mechanism 19 is provided to dynamically adjust the orientation of the optical movement sensor with respect to the vehicle so that the optical movement sensor's orientation remains the same as the vehicle moves and turns. Such gimbal mounting devices and mechanisms are commercially available and will be known to those skilled in the art. They therefore require no further explanation. The gimballed mounting device or mechanism could also monitor the change in the optical movement sensor's orientation relative to the orientation of the vehicle, and this information could be used to calculate or determine changes in the vehicle's orientation about its yaw Z axis.

Figure 1C:
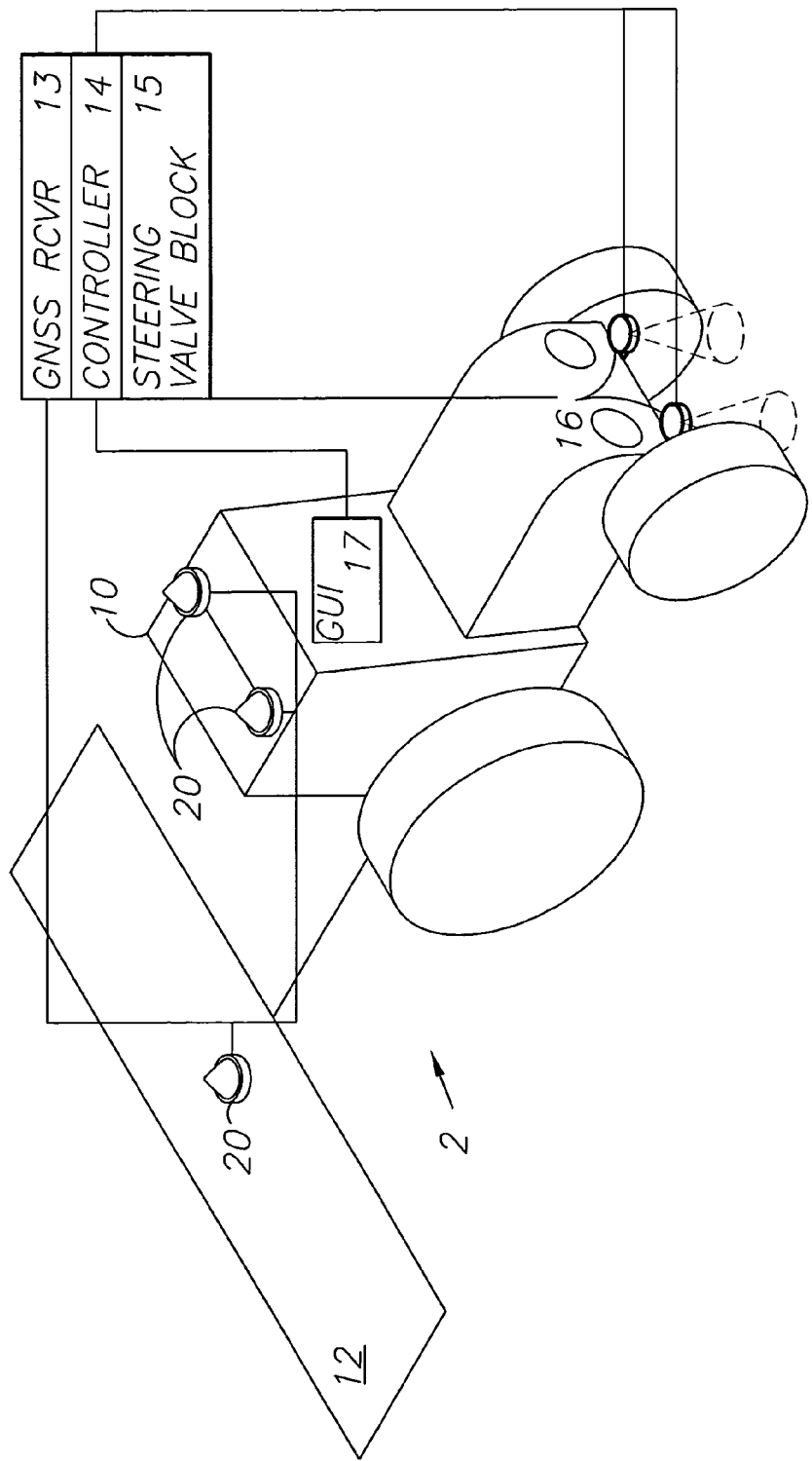
FIG. 1C shows a vehicle fitted with an optical tracking control system in accordance with another embodiment of the present invention including a pair of optical tracking sensors.

The alternative embodiment shown in FIG. 1C accommodates calculating and determining attitude changes in the vehicle's orientation about its yaw Z axis, which attitude changes indicate the vehicle's heading or direction of travel. Two optical movement sensors 16 are mounted on the front of the vehicle 10 and each measures movement of the vehicle along the longitudinal roll Y axis and along the transverse pitch X axis of the vehicle. However, where the longitudinal and transverse movements detected by each optical movement sensor 16 differs, this difference will generally be associated with changes in the vehicle's orientation about its yaw Z axis. Therefore, this difference may be used to calculate or determine changes in the vehicle's orientation about its yaw Z axis. As an example, the vehicle might be provided with an optical movement sensor 16 adjacent to and inboard of the front wheels (FIG. 1C). Therefore, there would be one optical movement sensor on either side of the vehicle at the front of the vehicle. If the vehicle were to turn a corner (which would make it rotate about its yaw Z axis), the optical movement sensor 16 on the outside of the turning circle would measure a greater distance travelled than the optical movement sensor on the inside. This difference could then be used, along with the known positioning of each optical movement sensor with respect to the other, to calculate or determine the change in the vehicle's orientation about its yaw Z axis.

3. Alternative Embodiment Optical Control System 102

Figure 2:
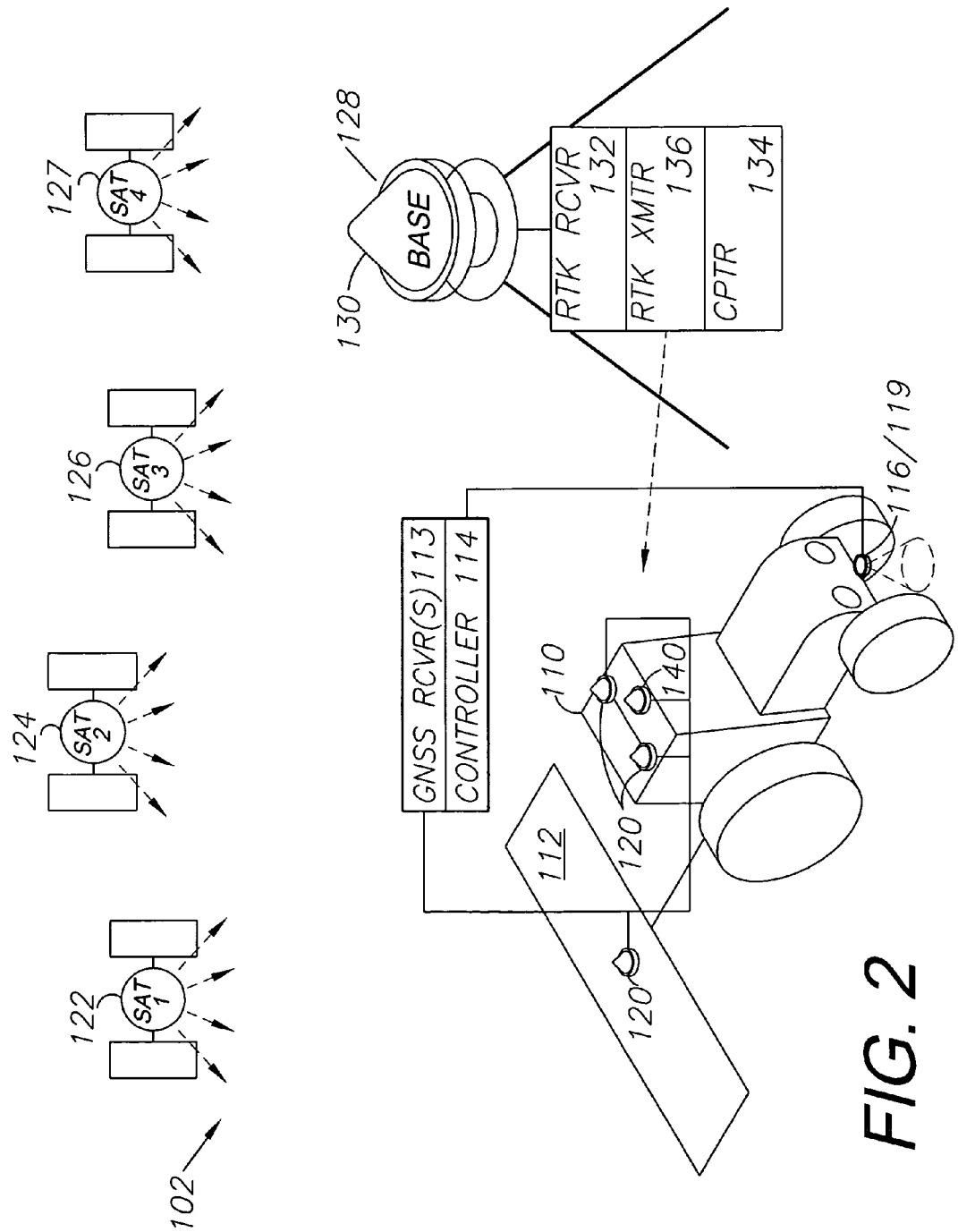
FIG. 2 shows a real-time kinematic (RTK) optical tracking vehicle control system in accordance with another embodiment of the present invention.

FIG. 2 shows a schematic diagram of an alternative embodiment of the present invention. A number of the features of the embodiment shown in FIG. 2 are similar to those shown in FIG. 1. For convenience and brevity of description, similar features in FIG. 2 are denoted by the same reference numeral as those used to denote similar features in FIG. 1, but increased by 100. For example, tractor 110 in FIG. 2 corresponds to tractor 10 in FIG. 1. It can be seen that the embodiment shown in FIG. 2 also includes a controller 114 and an optical movement sensor 116.

The embodiment shown in FIG. 2 further includes a differential GNSS system. The differential GNSS system includes a GNSS receiver(s) 113 connected to satellite antennas 120. The satellite antennas 120 are mounted on the roof of the tractor 110 and optionally on the implement 112. Such multiple antennas 120 enable vector calculations of the tractor attitude. The satellite antennas 120 receive satellite signals from the array of GNSS satellites orbiting the earth, shown schematically at 122, 124, 126 and 127. The differential GNSS system also includes a base station 128. The base station 128 includes a GNSS antenna 130 connected to a GNSS receiver 132. The antenna 130 receives signals from the orbiting GNSS satellites 122, 124, 126 and 127. The GNSS receiver 132, on the basis of the signals coming from antenna 130, calculates and provides positional data to a computer 134. The computer compares the positional data from the GNSS receiver 132 with a predetermined and accurately known position for antenna 130. On the basis of this comparison, computer 134 is able to calculate an error factor, which is continuously updated and passed to a transmitter 136, such as a radio modem. The transmitter 136 generates a serial data signal which is upconverted and propagated by the base antenna 130. The transmitted error signal is received by an antenna 140 mounted on tractor 110.

The GNSS receiver on the tractor 110 receives GNSS signals from the constellation of GNSS satellites via GNSS antenna 120 mounted on the tractor 110. The signals are sent to controller 114. The signals received from GNSS receiver(s) 113 on tractor 110 are corrected by the error correction signal sent from the transmitter 138. Thus, an accurate determination of position of the tractor can be obtained from the differential GNSS system.

The controller 114 also receives position signals from the optical movement sensor 116. As described above with reference to the embodiment in FIG. 1, if the optical movement sensor 116 in FIG. 2 is the kind used in optical computer mice, and if it is fixed to the vehicle, two or more such fixed optical movement sensors would need to be provided if the optical movement sensor is to be used to measure changes in the vehicle's orientation about its yaw axis. Alternatively, a single optical movement sensor might be used, provided the single optical movement sensor is mounted in a gimballed manner and the device or mechanism used for the gimballed mounting can monitor the changes in the orientation of the optical movement sensor relative to the orientation of the vehicle. Further explanation of the embodiment in FIG. 2 will be provided below.

4. Alternative Embodiment Optical Control System 202

Figure 3:
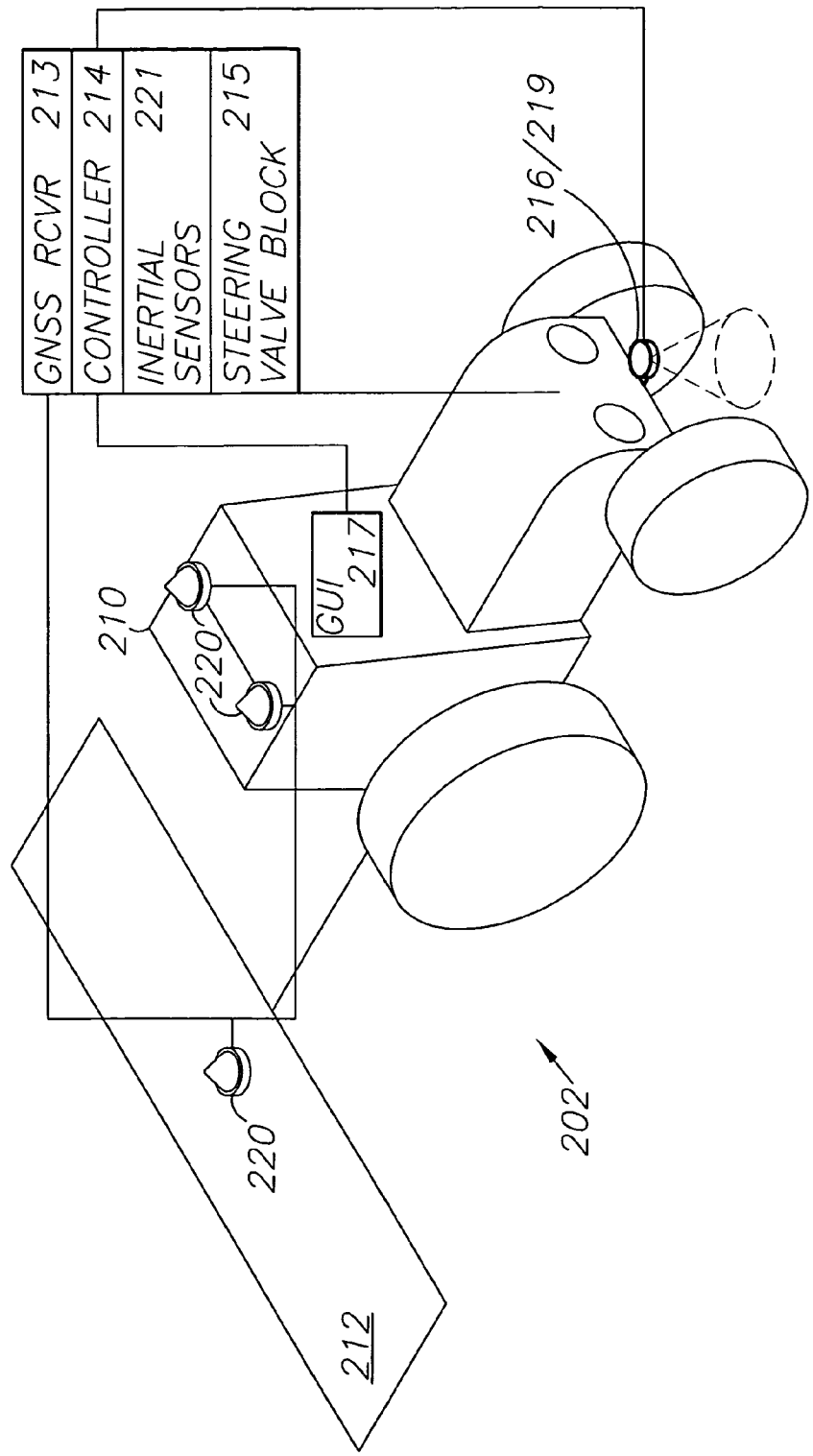
FIG. 3 shows a vehicle fitted with an optical tracking control system in accordance with another embodiment of the present invention including an inertial navigation system (INS) with inertial sensors.

FIG. 3 shows a schematic diagram of an alternative embodiment of the present invention. A number of the features of the embodiment shown in FIG. 3 are similar to those shown in FIG. 1. For convenience and brevity of description, similar features in FIG. 3 are denoted by the same reference numeral as used to denote those features in FIG. 1, but increased by 200. For example, tractor 210 in FIG. 3 corresponds to tractor 10 in FIG. 1. It can be seen that the embodiment shown in FIG. 2 also includes a controller 214 and an optical movement sensor 216.

The embodiment shown in FIG. 3 also includes one more inertial sensors 221 mounted to the tractor. The one more inertial sensors may comprise one or more accelerometers and/or gyroscopes. Instead of the inertial sensors, one or more vehicle based sensors may be used. These may include magnetometers, wheel angle sensors and/or wheel speed encoders. A combination of inertial sensors and vehicle-based sensors may also be used. An assembly of sensors, such as an Inertial Navigation System (INS), a Dynamic Measurement Unit (DMU), an Inertial Sensor Assembly (ISA), a Vertical Gyro (VG) or an Attitude Heading Reference System (AHRS) may be used in feature 221. The inertial sensors may comprise one or more, or an assembly of sensors including accelerometers and rate gyroscopes for providing further position and attitude signals to the controller. Preferably (although not necessarily), the assembly may comprise between one and three sensor sets orthogonally mounted, with each sensor set comprising not necessarily one of each, but no more than one of each of the above mentioned sensors.

The sensor assembly 221 provides relative position and attitude information to the controller 214. Similarly, the optical movement sensor 216 also provides relative position and attitude information to controller 214. The controller uses both sets of information to obtain a more accurate determination of the position and attitude of the vehicle. This will be described in greater detail hereunder. Also, as described above with reference to the embodiments in FIGS. 1 and 2, if the optical movement sensor 216 in FIG. 3 is the kind used in optical computer mice, and if it is fixed to the vehicle, two or more such fixed optical movement sensors would need to be provided if the optical movement sensor is to be used to measure changes in the vehicle's orientation about its yaw Z axis. Alternatively, a single optical movement sensor might be used, provided the single optical movement sensor is mounted in a gimballed manner and the device or mechanism used for the gimballed mounting can monitor the changes in the orientation of the optical movement sensor relative to the orientation of the vehicle.

5. Alternative Embodiment Optical Control System 302

Figure 4:
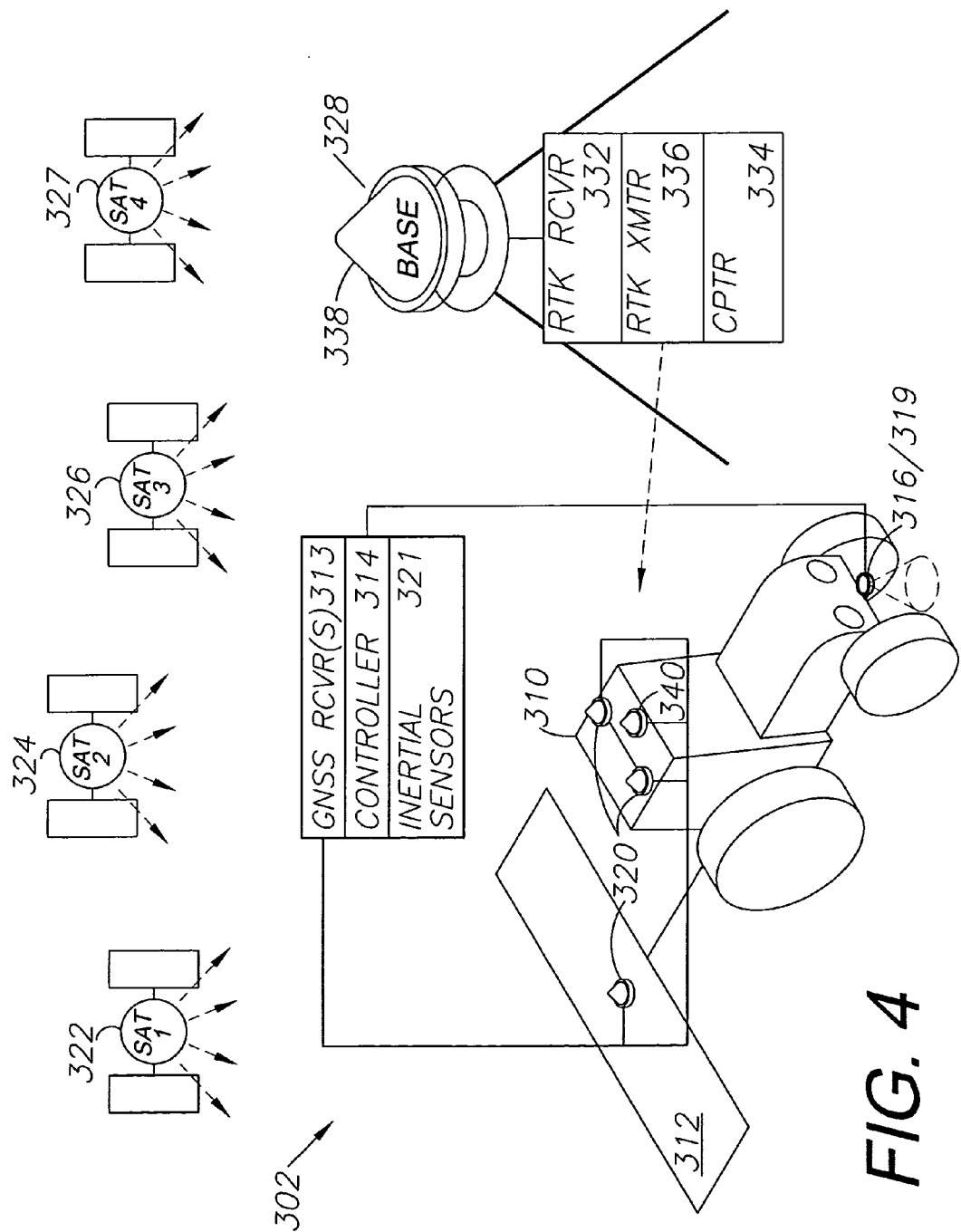
FIG. 4 shows an RTK optical tracking vehicle control system in accordance with another embodiment of the present invention including an INS.

FIG. 4 shows a schematic view of a further embodiment of the present invention. A number of the features of the embodiment shown in FIG. 4 are similar to those shown in FIG. 2. For convenience and brevity of description, similar features in FIG. 4 are denoted by the same reference numeral as used to denote those features in FIG. 2, but with the leading "1" of the reference numerals used in FIG. 2 replaced with a leading "3" in FIG. 4 (i.e., plus 200). For example, tractor 310 in FIG. 4 corresponds to tractor 110 in FIG. 2.

The embodiment shown in FIG. 4 includes an optical movement sensor 316, a GNSS-based system 319 and an inertial sensor and/or vehicle based sensor 321. These sensors interact with the controller in a manner that will be described hereunder.

Figure 5:
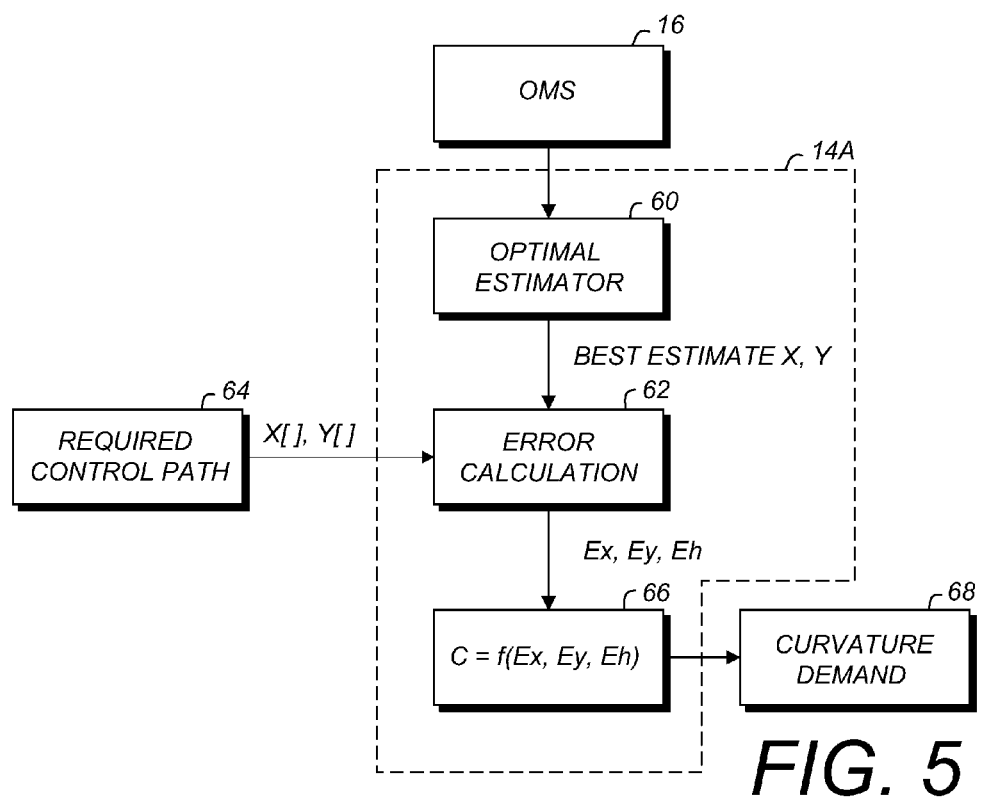
FIG. 5 shows a flow sheet illustrating the interaction of an optical movement sensor with a controller in accordance with an embodiment of the present invention.

FIG. 5 shows a schematic flow sheet of the interaction between the optical movement sensor and the controller. The flow sheet is based upon the embodiment shown in FIG. 1. Only one optical movement sensor is shown in FIG. 5. However, as explained above, there could alternatively be two or more optical movement sensors all feeding into the control system in the same way as the one shown in FIG. 5. The way that two or more optical movement sensors can be used to measure changes in the vehicle's orientation about its yaw axis has already been explained. However, providing two or more optical movement sensors may also provide the additional benefit of increasing the accuracy of the position and attitude information calculated by the optical estimator (compared with systems that use only a single optical movement sensor) due to the greater amount of information available upon which the estimates can be based.

In FIG. 5, the controller 14 of FIG. 1 is shown by dotted outline 14A. The controller of FIG. 5 includes an optimal estimator 60 and an error calculation module 62. The optimal estimator 60 and error calculation module 62 may form part of the computer memory and/or CPU of the controller 14. The particular programs required to run the optimal estimator and error calculation module may be written into the computer memory or they may be downloaded from a network or they may be loaded onto the computer memory via an optical drive, such as a CD drive or a DVD drive, or they may be loaded from any other form of recorded media. Alternatively, the optimal estimator and the error calculation module may be provided in firmware associated with the controller 14.

The optical movement sensor(s) 16 of FIG. 1 feeds position and attitude data into optimal estimator 60. Optimal estimator 60 acts to process the information from the optical movement sensor(s) 16 to provide a statistically optimal estimate of the position and attitude information received from the optical movement sensor(s). The optimal estimator may include algorithms that receive the position and attitude information from optical movement sensor(s) 16 and convert that position and attitude information into a calculated or determined position and attitude of the tractor. This produces a statistically optimal estimate of the calculated or determined position and attitude of the tractor.

FIGS. 5-8 schematically represent the operation of the control system in accordance with different embodiments of the invention. However, it is also useful to consider the way in which the vehicle's parameters and dynamics are represented for the purposes of implementing the control system. Those skilled in the art will recognize that a range of methods may be used for this purpose. However, it is considered that one method is to represent the parameters and dynamics in "state space" form.

In state space representations, the variables or parameters used to mathematically model the motion of the vehicle, or aspects of its operation, are referred to as "states" $x_i$. In the present case, the states may include the vehicle's position (x,y), velocity $$\left(\frac{dx}{dt}, \frac{dy}{dt}\right)$$

heading h, radius of curvature r, etc. Hence the states may include $x_1=x$, $x_2=y$, $x_3=h$, $x_4=\dot{h}$, $$x_5 = \frac{dx}{dt} = \frac{dx_1}{dt}, x_6 = \frac{dy}{dt} = \frac{dx_2}{dt}$$

etc. However, it will be appreciated that the choice of states is never unique, and the meaning and implications of this will be well understood by those skilled in the art.

The values for the individual states at a given time are represented as the individual entries in an n×1 "state vector":

$$\underline{X}(t)=[x_1(t)x_2(t)x_3(t)x_4(t)\ldots x_n(t)]^T$$

where n is the number of states.

In general, the mathematical model used to model the vehicle's motion and aspects of its operation will comprise a series of differential equations. The number of equations will be the same as the number of states. In some cases, the differential equations will be linear in terms of the states, whereas in other situations the equations may be nonlinear in which case they must generally be "linearized" about a point in the "state space". Linearization techniques that may be used to do this will be well known to those skilled in this area.

Next, by noting that any $j^{th}$ order linear differential equations can be re-written equivalently as a set j first order linear differential equations, the linear (or linearized) equations that represent the model can be expressed using the following "state" equation:

$$\frac{d}{dt}(\underline{X}(t)) = A\underline{X}(t) + B\underline{U}(t) + E\underline{w}(t)$$

where:
A is an n×n matrix linking the state time derivatives to the states themselves, $\underline{U}(t)$ is an m×1 matrix containing the external "forcing" inputs in the mathematical model, B is an n×m matrix linking the state derivatives to the inputs, m is the number of inputs, $E\underline{w}(t)$ is a quantity (represented by an n×1 vector) called the "process noise". The process noise represents errors in the model and vehicle dynamics which exist in the actual vehicle but which are not accounted for in the model. As $E\underline{w}(t)$ represents an unknown quantity, its contents are not known. However, for reasons that will be understood by those skilled in this area, in order to allow statistically optimized signal processing and state estimation $E\underline{w}(t)$ is generally assumed to be Gaussian, white, have zero mean and to act directly on the state derivatives. It is also assumed that the process noise element associated with each individual state is uncorrelated with the process noise element of the other states.

The quantities that are desired to be known about the vehicle (the real values for which are generally also measured from the vehicle itself, if possible) are the outputs y, from the model. Each of the outputs generated by the linear (or linearized) model comprises a linear combination of the states x, and inputs u, and so the outputs can be defined by the "output" or "measurement" equation:

$$\underline{Y}(t)=C\underline{X}(t)+D\underline{U}(t)+M\underline{v}(t)$$

where
C is a j×n matrix linking the outputs to the states,
D is a j×m matrix linking the outputs to the inputs,
j is the number of outputs, and
$M\underline{v}(t)$ is a quantity (represented by an n×1 vector) called the "measurement noise". The measurement noise represents errors and noise that invariably exist in measurements taken from the actual vehicle. Like $E\underline{w}(t)$ above, $M\underline{v}(t)$ is assumed to be Gaussian, white, have zero mean, to act directly on the state derivatives and to be uncorrelated with the process noise or itself.

Next, it will be noted that both the state equation and the measurement equation defined above are continuous functions of time. However, continuous time functions do not often lend themselves to easy digital implementation (such as will generally be required in implementing the present invention) because digital control systems generally operate as recursively repeating algorithms. Therefore, for the purpose of implementing the equations digitally, the continuous time equations may be converted into the following recursive discrete time equations by making the substitutions set out below and noting that (according to the principle of superposition) the overall response of a linear system is the sum of the free (unforced) response of that system and the responses of that system due to forcing/driving inputs. The recursive discrete time equations are:

$$\underline{X}_{k+1}=F\underline{X}_k+G\underline{U}_{k+1}+L\underline{w}_{k+1}$$

$$\underline{Y}_{k+1}=Z\underline{Y}_k+J\underline{U}_{k+1}+N\underline{w}_{k+1}$$

where
k+1 is the time step occurring immediately after time step k,
Z=C, J=D and $N\underline{v}$ is the discrete time analog of the continuous time measurement noise $M\underline{v}(t)$.
F is a transition matrix which governs the free response of the system. F is given by:

$$F=e^{A\Delta t}$$

$GU_{k+1}$ is the forced response of the system, i.e. the system's response due to the driving inputs. It is defined by the convolution integral as follows:

$$GU_{k+1} = \int_0^{\Delta t} e^{A(\Delta t - \tau)} BU(t_{k+1} + \tau) d\tau$$

Similarly, the quantity $Lw_{k+1}$ is the (forced) response of the system due to the random "error" inputs that make up the process noise. Hence, conceptually this quantity may be defined as:

$$Lw_{k+1} = \int_0^{\Delta t} e^{A(\Delta t - \tau)} Ew(t_{k+1} + \tau) d\tau$$

However, as noted above, the quantity $Ew(t)$ is not deterministic and so the integral defining $Lw_{k+1}$ cannot be performed (even numerically). It is for this reason that it is preferable to use statistical filtering techniques. The optimal estimator shown in FIGS. 5-8 will use such statistical techniques. One particularly favorable technique involves the use of a Kalman filter to statistically optimize the states estimated by the mathematical model.

In general, a Kalman filter operates as a "predictor-corrector" algorithm. Hence, the algorithm operates by first using the mathematical model to "predict" the value of each of the states at time step k+1 based on the known inputs at time step k+1 and the known value of the states from the previous time step k. It then "corrects" the predicted value using actual measurements taken from the vehicle at time step k+1 and the optimized statistical properties of the model. In summary, the Kalman filter comprises the following equations each of which is computed in the following order for each time step:

$$\left.\begin{aligned}
X_{k+1|k} &= FX_{k|k} + GU_{k+1} \\
P_{k+1|k} &= FP_{k|k}F^T + Q \\
K_{k+1} &= P_{k+1|k}Z^T(ZP_{k+1|k}Z^T + R)^{-1} \\
Y_{k+1} &= ZX_{k+1|k} + JU_{k+1}
\end{aligned}\right\} \text{predictor}$$

$$\left.\begin{aligned}
\upsilon_{k+1} &= \hat{Y}_{k+1} - Y_{k+1} \\
X_{k+1|k+1} &= X_{k+1|k} + K_{k+1}\upsilon_{k+1} \\
P_{k+1|k+1} &= (I - K_{k+1}Z)P_{k+1|k}
\end{aligned}\right\} \text{corrector}$$

where the notation k+1|k means the value of the quantity in question at time step k+1 given information from time step k. Similarly, k+1|k+1 means the value of the quantity at time step k+1 given updated information from time step k+1.

P is the co-variance in the difference between the estimated and actual value of $X$.

Q is the co-variance in the process noise.

K is the Kalman gain which is a matrix of computed coefficients used to optimally "correct" the initial state estimate.

R is the co-variance in the measurement noise.

$\hat{Y}$ is a vector containing measurement values taken from the actual vehicle.

$\upsilon$ is a quantity called the "innovation" which is the difference between the measured values actually taken from the vehicle and values for the corresponding quantities estimated by the model.

Figure 12:
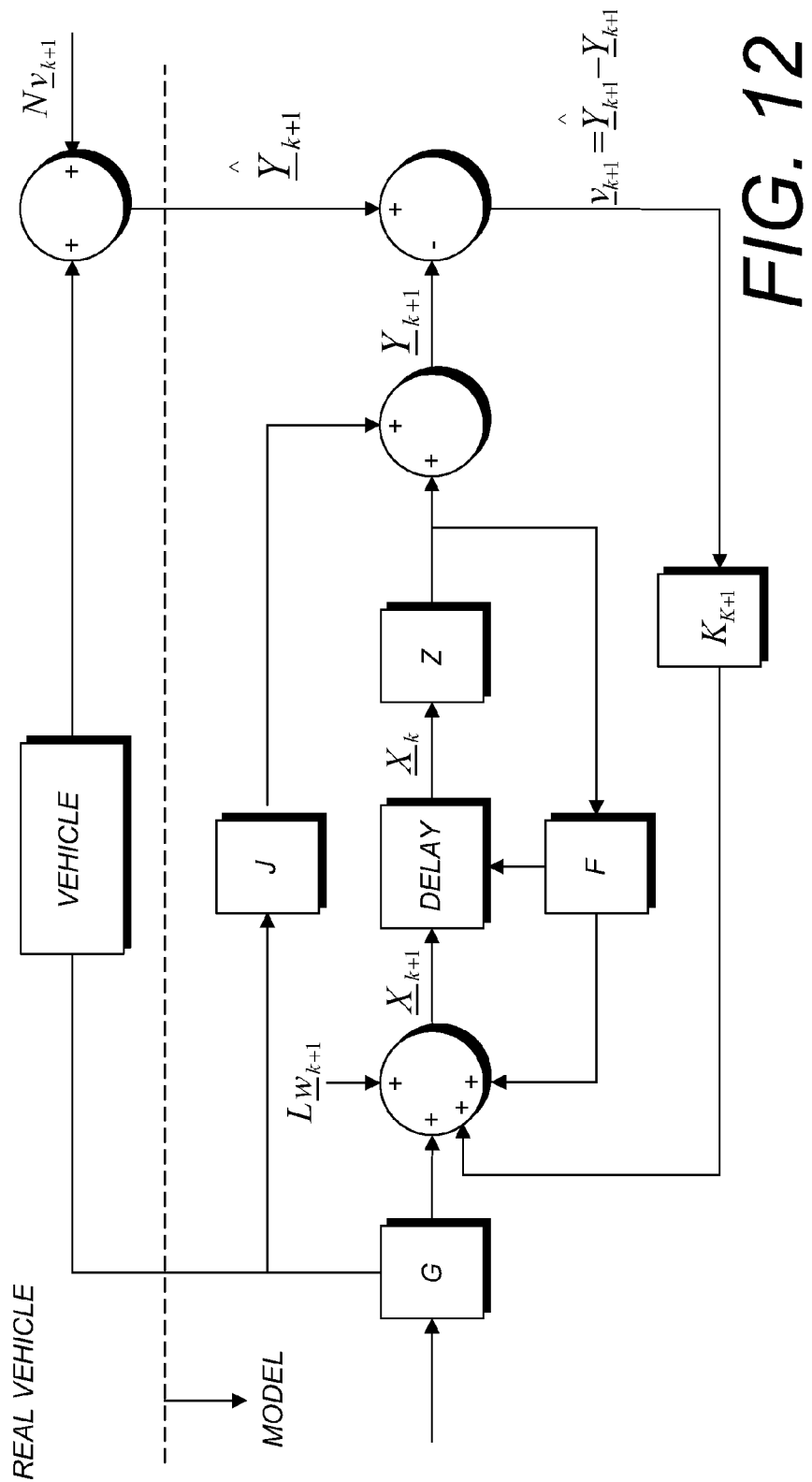
FIG. 12 is a schematic illustration of the operation of a discrete-time Kalman filter, which may be used in an optimal estimator of the present invention.

The operation of the discrete time Kalman filter which may be used in the optimal estimator of the present invention is schematically illustrated in FIG. 12.

Returning now to FIG. 5, the statistically optimal estimate of the vehicle's position and attitude provided by the optimal estimator 60 is supplied to the error calculation module 62. The error calculation module 62 receives information on the required control path 64 (or the desired path of travel). The required control path or the desired path of travel may be entered into the computer memory of the controller or it may be calculated from an initial wayline and further operating parameters, such as the width of the implement being towed by the tractor.

The error calculation module 62 uses the statistically optimal estimate of the position and attitude of the tractor obtained from the optimal estimator 60 and the desired position and attitude of the tractor determined from the required control path to calculate the error in position and attitude of the tractor. This may be calculated as an error in the x-coordinate, an error in the y-coordinate and an error in the heading of the position and attitude of the tractor. These error values are represented as "Ex", "Ey" and "Eh" in FIG. 5. These error values are used in a correction calculation module 66 to determine a correction value. The correction value may result in a curvature demand 68, which represents a steering control signal that is sent to a steering control mechanism. The correction value is calculated as a function of the error in the coordinate values.

Figure 6:
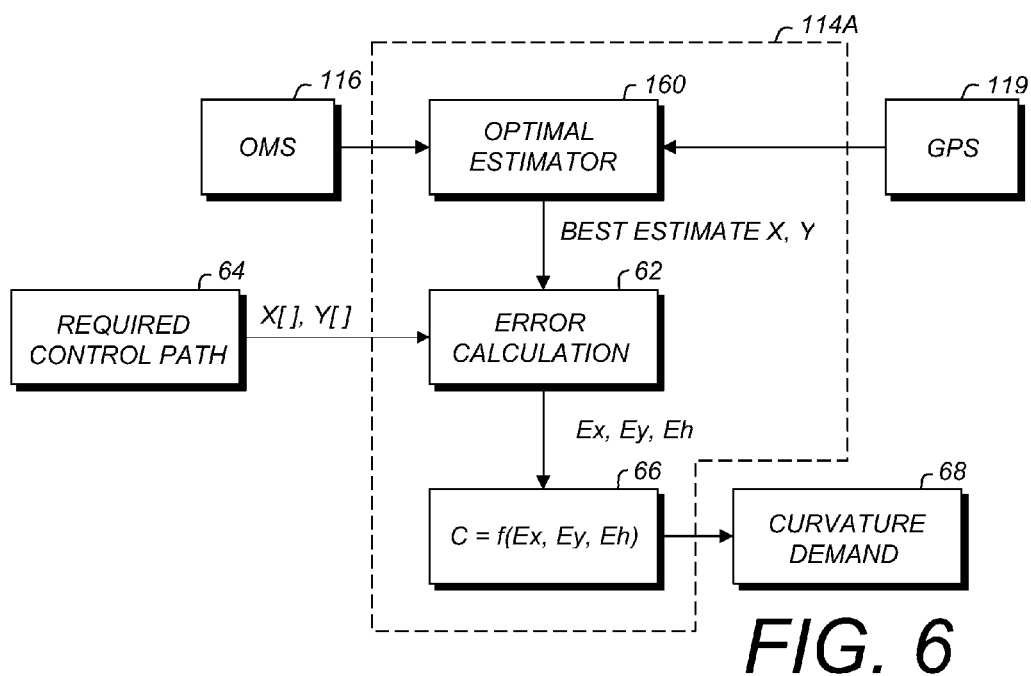
FIG. 6 shows a flow sheet illustrating the interaction of an optical movement sensor and a GNSS sensor with a controller in accordance with an embodiment of the present invention.

FIG. 6 shows a schematic flow sheet of the interaction of the optical movement sensor(s) and GNSS sensor with the controller. This flow sheet represents one possible implementation for use with the embodiment shown in FIG. 2. The error correction module 62, desired control path 64, correction calculation module 66 and curvature demand 68 shown in FIG. 6 are essentially identical to those shown in FIG. 5 and will not be described further. However, as can be seen from FIG. 6, the controller, which is represented by dashed outline 114A, receives positional data from the optical movement sensor(s) 116 and the GNSS system 119. The GNSS system 119 shown in FIG. 6 may correspond to the differential GNSS system described with reference to FIG. 2. The optimal estimator 160 receives positional data from the optical movement sensor 116 end of the GNSS system 119. The optimal estimator 160 analyses the positional data from the optical movement sensor and the GNSS system to provide a statistically optimal estimate of the position coordinates of the tractor. The GNSS system provides absolute position coordinate data and the optical movement system provides relative position and attitude data. Both sources of data can be used to obtain a more accurate calculated or determined position and attitude of the vehicle.

In cases where a GNSS outage occurs, the optical movement sensor continues to provide position and attitude data to the optimal estimator. In such circumstances, control of the vehicle can be effected by the information received from the optical movement sensor alone.

As a further benefit arising from the system shown in FIG. 6, the optical movement sensor provides position and attitude data at a much greater frequency than a GNSS system. Therefore, the position and attitude data received from the optical movement sensor can be used to provide a determined or calculated vehicle position and attitude during periods between receipt of positional data from the GNSS system. This feature assists in maintaining enhanced accuracy in the position and attitude data.

Figure 7:
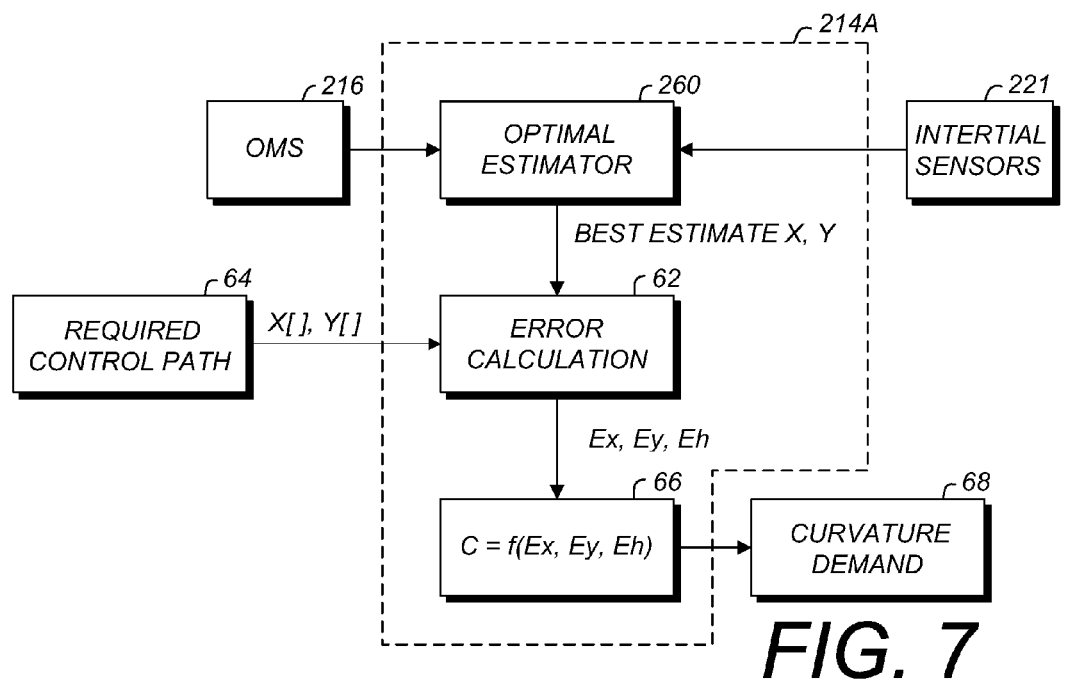
FIG. 7 shows a flow sheet illustrating the interaction of an optical movement sensor and inertial sensors with a controller in accordance with an embodiment of the present invention.

FIG. 7 shows a flow sheet of the interaction of optical movement sensor(s) and inertial sensors with the controller. This flow sheet may be used in the embodiment shown in FIG. 3. The error correction module 62, desired control path 64, correction calculation module 66 and curvature demand 68 shown in FIG. 7 are essentially identical to those as shown in FIGS. 5 and 6 and will not be described further. However, as can be seen from FIG. 7, the controller, which is represented by dashed outline 214A, receives positional data from the optical movement sensor(s) 216 and the inertial sensors 221. This positional data is received by the optimal estimator 260. The optimal estimator 60 analyses this data and provides a best estimate of the position of the vehicle.

Figure 8:
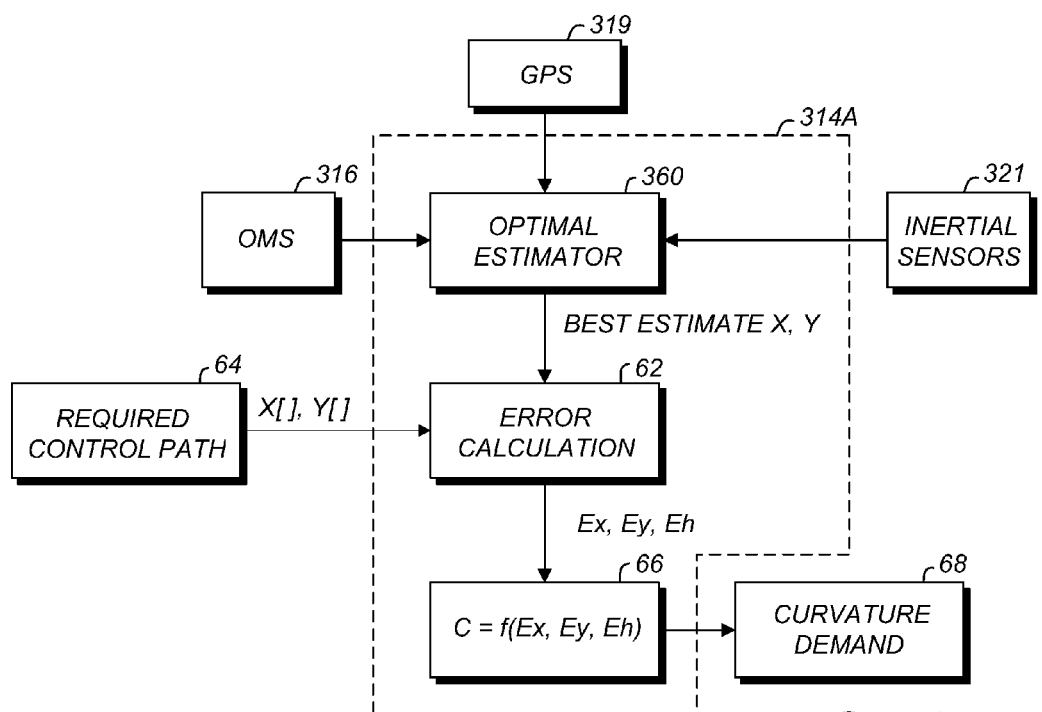
FIG. 8 shows a flow sheet illustrating the interaction of an optical movement sensor, inertial sensors and a GNSS sensor with a controller in accordance with an embodiment of the present invention.

FIG. 8 shows a flow sheet demonstrating the interaction of optical movement sensor(s), inertial sensors and the GNSS system. The flow sheet shown in FIG. 8 may be used as an implementation for the embodiment shown in FIG. 4. The error correction module 62, desired control path 64, correction calculation module 66 and curvature demand 68 shown in FIG. 8 are essentially identical to those shown in FIGS. 5-7 and will not be described further. In the embodiment shown in FIG. 8, the optimal estimator 60 receives positional data from the optical movement sensor 316, the GNSS system 319 and the inertial sensors 321. This data is sent to the optimal estimator 60 which produces a best estimate of the position of the vehicle. This is then sent to the error calculation module 62.

6. Alternative Embodiment Optical Control System 402

FIG. 9 shows a schematic view of another embodiment of the present invention in which an optical movement sensor 416A is mounted to the implement. As in the figures described above, two or more optical movement sensors may be provided, or a single optical movement sensor may be provided with the gimballed mounting. In the embodiment shown in FIG. 9, the optical movement sensor(s) 416A is used to provide positional data relating to the position of the implement 12. In FIG. 9, other features are essentially identical to those shown in FIG. 1 and, for convenience, have been denoted by the same reference numbers as used in FIG. 1, but increased by 400, and need not be described further.

The embodiments shown in FIGS. 2-4 may also be modified by replacing the optical movement sensors in those embodiments with an optical movement sensor mounted to the implement of those embodiments. It will also be appreciated that the position of the implement may be determined as well as the position of the vehicle. In such cases, the optical movement sensor 416A mounted to the implement 12 (as shown in FIG. 9) may comprise an additional optical movement sensor to the optical movement sensor mounted to the tractor, as shown in FIGS. 1 to 4.

Figure 10:
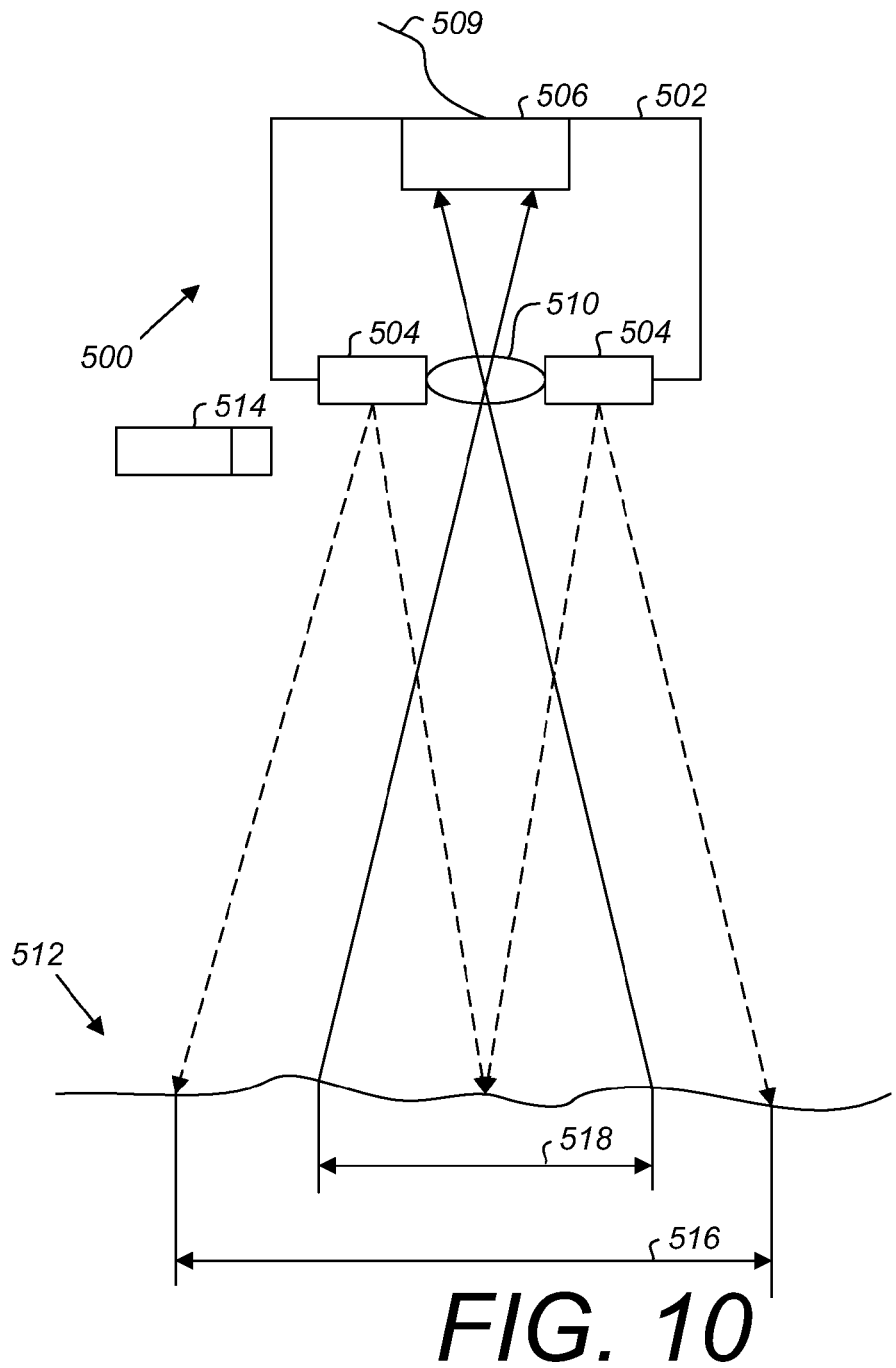
FIG. 10 shows a schematic diagram of one possible arrangement for an optical movement sensor that could be used in the present invention.
Figure 11:
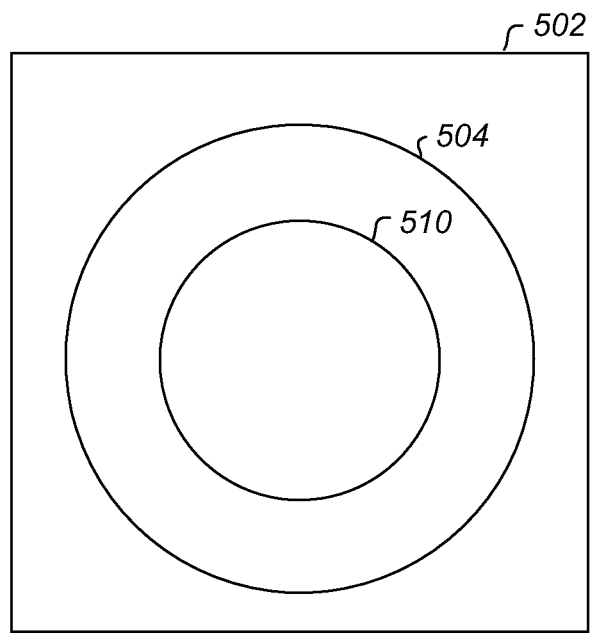
FIG. 11 shows an end view of the lens and LED illuminator ring used in the arrangement of FIG. 10.

FIG. 10 shows a schematic diagram of one possible embodiment of an optical movement sensor that may be used in the present invention. The optical movement sensor 500 shown in FIG. 10 includes a housing or enclosure 502. The housing 502 holds an illumination source 504, in the form of a ring of LEDs. The ring of LEDs is shown more clearly in FIG. 11. The housing 502 also houses a charged coupled device (CCD) detector and an integrated optical movement sensor chip 506. The detector and optical movement sensor chip 506 is suitably taken from an optical computer mouse. The housing 502 also houses a lens 510 (which will suitably be a telecentric lens). Light from the ring of LEDs that is reflected from the ground 512 is focused by the lens 510 onto the detector 506. In order to keep the lens 510 free of dirt and debris, a nozzle 514 may be positioned close to the lens 510. The nozzle 514 may periodically or continuously blow a jet of air over the lens 510 to thereby blow away any dirt or debris that may have settled on the lens. FIG. 10 also shows the field of illumination 516 and the field of view 518 provided by the arrangement 500.

The optical movement chip 506 sends signals to the optimal estimator, as shown in FIGS. 5 to 8. These signals may be sent via a wire 509 or via an appropriate wireless connection.

The present invention provides control systems that can be used to control the movement of the vehicle or an implement associated with the vehicle. The control system includes an optical movement sensor that may be the operative part of an optical computer mouse. These optical movement sensors are relatively inexpensive, provide a high processing rate and utilize proven technology. Due to the high processing rate of such optical movement sensors, the control system has a high clock speed and therefore a high frequency of updating of the determined or calculated position of the vehicle or implement. The optical movement sensor may be used by itself or it may be used in conjunction with a GNSS system, one or more inertial sensors, or one or more vehicle based sensors. The optical movement sensor can be used to augment the accuracy of inertial and/or other sensors. In particular, the optical movement sensor can be used to debias yaw drift that is often inherent in inertial sensors.

7. Alternative Embodiment Vehicle Control System 600

Figure 13:
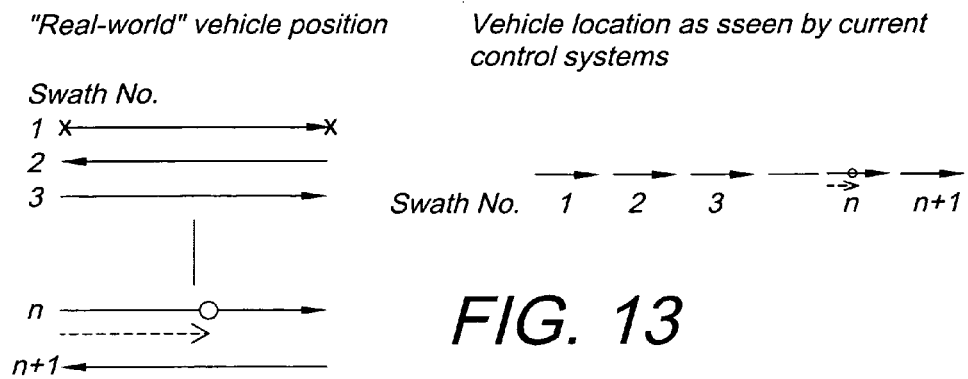
FIG. 13 schematically represents the difference between the vehicle's actual spatial location and what is "seen" by existing forms of "one-dimensional" controllers such as those described in the background section above.

As described in the background section above, one of the problems with existing vehicle control systems is that they are inherently "one-dimensional" or "linear" in nature. The inherent "linear" nature of existing control systems is illustrated schematically in FIG. 13. Whilst the "real world" spatial geometry of the respective swaths shown on the left in FIG. 13 may have been calculated, nevertheless from the control system's point of view at any given time the controller only "knows" that the vehicle is on the nth swath and that it has been moving along that swath for a known amount of time with known speed. Hence, at a fundamental level, the controller does not inherently know where the vehicle is located in space. This is represented graphically in FIG. 13.

Figure 14:
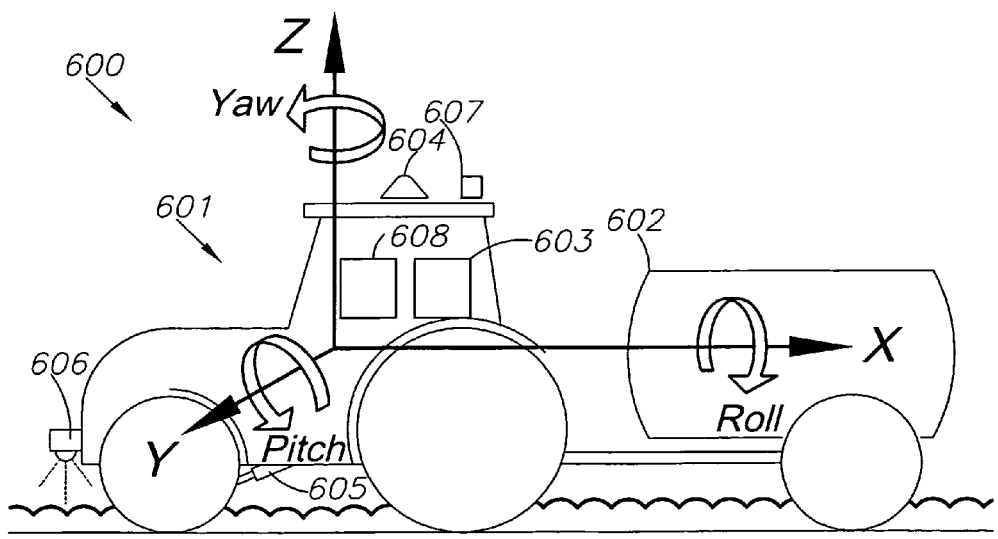
FIG. 14 is a pictorial representation of an agricultural vehicle having a control system in accordance with one particular embodiment of the present invention.

Next, FIG. 14 shows an agricultural vehicle 601 having a control system in accordance with one embodiment of the present invention. In FIG. 14, the agricultural vehicle 601 is a tractor towing an implement 602. The implement 602 could be a plow, harvester, seed sower, leveler, agricultural chemical applicator/dispenser or any other kind of agricultural implement. Furthermore, the embodiment of the invention shown in FIG. 14 could equally be applied on other kinds of vehicles operating in other areas, for example cars, mine-trucks, airport tarmac vehicles, etc.

The components of the control system in the particular embodiment shown in FIG. 14 include a main control unit 603, a GPS antenna 604 and actuators 605. The main control unit 603 houses the spatial database and also the electronic hardware used to implement the controller. The main control unit 603 may be an industrial computer (for example an industrial PC) capable of running other applications in addition to the vehicle control system. Alternatively, the main control unit 603 may be a purpose-built unit containing only the hardware required to run the controller, the spatial database and the other components of the vehicle control system.

The main control unit 603 receives GPS signals from the GPS antenna 604, and it uses these (typically in combination with feedback and/or other external spatial data signals) to generate a control signal for steering the vehicle. The control signal will typically be made up of a number of components or streams of data relating to the different parameters of the vehicle being controlled, for example the vehicle's "cross-track error", "heading error", "curvature error", etc. These parameters will be described further below. The control signal is amplified using suitable signal amplifiers (not shown) to create a signal that is sufficiently strong to drive the actuators 605. The actuators 605 are interconnected with the vehicle's steering mechanism (not shown) such that the actuators operate to steer the vehicle as directed by the control signal.

In some embodiments, further actuators (not shown) may also be provided which are interconnected with the vehicle's accelerator and/or braking mechanisms, and the control signal may incorporate components or signal streams relating to the vehicle's forward progress (i.e. its forward speed, acceleration, deceleration, etc.). In these embodiments, the component(s) of the control signal relating to the vehicle's forward progress may also be amplified by amplifiers (not shown) sufficiently to cause the actuators which are interconnected with the accelerator/braking mechanism to control the vehicle's acceleration/deceleration in response to the control signal.

The vehicle 601 may also be optionally provided with one or more optical sensors 606, one or more inertial sensors 607 and a user terminal 608. One form of optical sensor 606 that may be used may operate by receiving images of the ground beneath the vehicle, preferably in rapid succession, and correlating the data pertaining to respective successive images to obtain information relating to the vehicle's motion. Other forms of optical sensor may also be used including LIDAR (Light Detection and Ranging) or sensors which operate using machine vision and/or image analysis. If present, the one or more inertial sensors 607 will typically include at least one gyroscope (e.g., a rate gyroscope), although the inertial sensors 607 could also comprise a number of sensors and components (such as accelerometers, tilt sensors and the like) which together form a sophisticated inertial navigation system (INS). The vehicle may be further provided with additional sensors (not shown) such as sensors which receive information regarding the location of the vehicle relative to a fixed point of known location in or near the field, magnetometers, ultrasonic range and direction finding and the like. The data generated by these additional sensors may be fed into the database and used by the control system to control the vehicle as described below.

In embodiments where the main control unit 603 comprises an industrial PC or the like, the user terminal 608 may comprise a full computer keyboard and separate screen to enable the user to utilize the full functionality of the computer. However, in embodiments where the main control unit is a purpose-built unit containing only hardware relating to the vehicle's control system, the terminal 608 may comprise, for example, a single combined unit having a display and such controls as may be necessary for the user to operate the vehicle's control system. Any kind of controls known by those skilled in this area to be suitable may be used on the main control unit, including keypads, joysticks, touch screens and the like.

In FIG. 14, the user terminal 608 is positioned in the vehicle cabin so that it can be operated by the driver as the vehicle moves. However, those skilled in the art will recognize that the present control system could also be operated by wireless remote control, meaning that the user terminal 608 could alternatively be totally separate from the vehicle and could operate the vehicle's control system from a remote location. It is also envisaged that a single remote user terminal 608 may be used to wirelessly interface with the control systems of multiple vehicles (possibly simultaneously) so that the user can control multiple moving vehicles from the one remote terminal.

Figure 15:
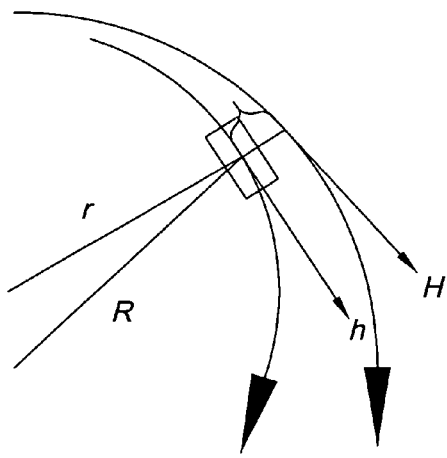
FIG. 15 illustrates the physical meaning of certain parameters controlled by some versions of the present control system, namely the "cross-track error", the "heading error" and the "curvature error".

In order to control the steering of the vehicle, there are three parameters that should be controlled. These are the "cross-track error", the "heading error" and the "curvature error". The physical meaning of these parameters can be understood with reference to FIG. 15. The "cross-track error" is the lateral difference between the vehicle's actual position, and its desired position. This is illustrated by the "{" bracket in FIG. 15. The "heading error" is the difference between the vehicle's actual instantaneous direction of motion h (i.e. its actual compass heading), and its desired instantaneous direction of motion H. The heading error is given by:

Heading Error=$H-h$

Those skilled in the art will recognize that both h and H are inherently directional quantities.

Finally, the "curvature error" is the difference between the actual instantaneous radius of curvature r of the vehicle's motion and the desired instantaneous radius of curvature R. The curvature error is given by:

Curvature Error=$1/R-1/r$

It will also be clearly appreciated that there may be many other vehicle variables or parameters which also need to be controlled if, for example, acceleration/deceleration or the vehicle's mode of equipment operation are also to be controlled.

Figure 16:
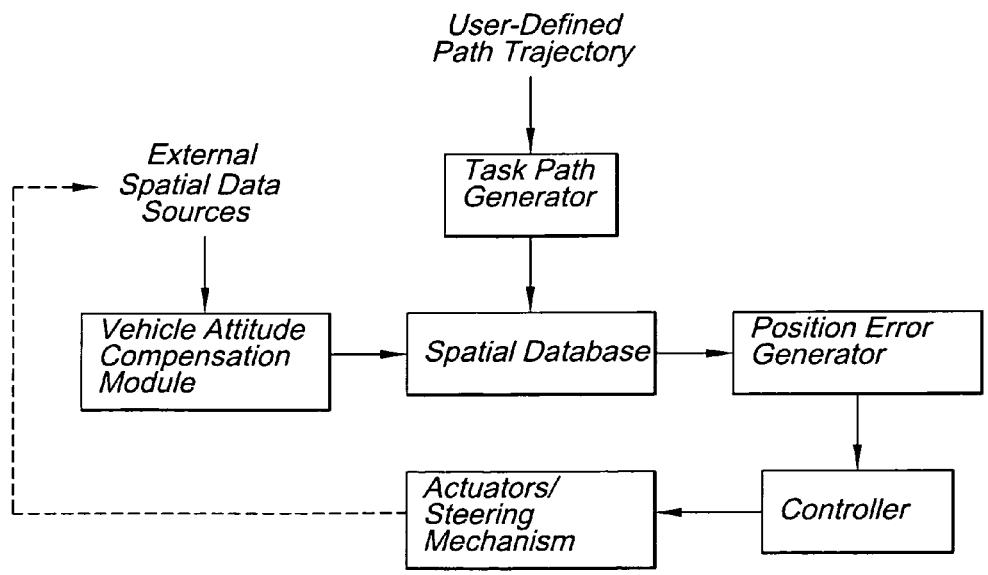
FIG. 16 is a schematic "block-diagram" representation of an overall control system structure that may be used in representative embodiments of the present invention.

Referring next to FIG. 16, it can be seen that a vehicle control system in accordance with one particular embodiment of the invention comprises: a task path generator; a spatial database; at least one external spatial data source; a vehicle attitude compensation module; a position error generator; a controller; and actuators to control (steer) the vehicle.

In the overall operation of the control system, the desired path trajectory for the vehicle is first entered into the control system by the user via the user terminal 608. The task path generator then interprets this user-defined path definition and converts it into a series of points of sufficient spatial density to adequately represent the desired path to the requisite level of precision. The task path generator typically also defines the vehicle's desired trajectory along the user-defined path, for example, by generating a desired vehicle position, a desired heading H and a desired instantaneous radius of curvature R for each point on the path. This information is then loaded into the spatial database. The way in which this and other spatial information is stored within the database in representative embodiments, and in particular the way in which pieces of data are given memory allocations according to their spatial location, is described further below.

As the vehicle moves along the user-defined path, it will invariably experience various perturbations in its position and orientation due to, for example, bumps, potholes, subsidence beneath the vehicle's wheels, vehicle wheel-spin, over/understeer, etc. Those skilled in this area will recognize that a huge range of other similar factors can also influence the instantaneous position and orientation of the vehicle as it moves. One of the purposes of the present control system is to automatically correct for these perturbations in position and orientation to maintain the vehicle on the desired path (or as close to it as possible).

As the vehicle moves, the control system progressively receives updated information regarding spatial location from the external spatial data sources. The external spatial data sources will typically include GPS. However, a range of other spatial data sources may also be used in addition to, or in substitute for GPS. For example, the inertial navigation systems (INS), visual navigation systems, etc. described above may also be used as external data sources in the present control system.

Those skilled in the art will recognize that the spatial data collected by the external spatial data sources actually pertains to the specific location of the external spatial data receivers, not necessarily the vehicle/implement reference location itself (which is what is controlled by the control system). In FIG. 14, the reference location is on the vehicle 601 and is indicated by the intersection (i.e. the origin) of the roll, pitch and yaw axes. In other embodiments, the reference location may be located elsewhere on the vehicle, or on the implement 602, etc. In any event, to illustrate this point, it will be seen that the GPS antenna 604 in FIG. 14 is located on the roof of the vehicle some distance from the vehicle's reference point. Therefore, the spatial data collected by the GPS antenna actually relates to the instantaneous location of the vehicle's roof, not the location of the vehicle's reference point. Likewise, the spatial data collected by the optical sensor 606 actually pertains to the particular location of the optical sensor (slightly out in front of the vehicle in FIG. 14).

In addition to this, changes in the vehicle's attitude will also influence the spatial position readings received by the different receivers. For example, if one of the vehicle's wheels passes over, or is pushed sideways by a bump, this may cause the vehicle to rotate about at least one (and possibly two or three) of the axes shown in FIG. 14. This will in turn change the relative position of the spatial data receiver(s) such as GPS antenna 604 with respect to the reference location on the vehicle or implement. This can be used (typically in combination with other sources of external spatial data or "feedback" data) to determine the orientation of the vehicle. The orientation of the vehicle may be considered to be the relative orientation of the vehicle's axes in space.

In order to compensate for the difference in position between the vehicle's reference point and the location of the spatial data receiver(s), and also to account for changes in the vehicle's orientation, a vehicle attitude compensation module is provided. This is shown in FIG. 16. The vehicle attitude compensation module converts all readings taken by the various spatial data receivers (which relate to the different specific locations of the receivers) into readings pertaining to the spatial location and orientation of the vehicle's reference point. This data pertaining to the spatial location and orientation of the vehicle's reference point is then fed into the spatial database.

Those skilled in the art will recognize that the one or more external spatial data sources will progressively receive updated data readings in rapid succession (e.g., in "real time" or as close as possible to it). These readings are then converted by the vehicle attitude compensation module and fed into the spatial database. The readings may also be filtered as described above. Therefore, whilst each reading from each spatial data source is received, converted (ideally filtered) and entered into the spatial database individually, nevertheless the rapid successive way in which these readings (possibly from multiple "parallel" data sources) are received, converted and entered effectively creates a "stream" of incoming spatial data pertaining to the vehicle's continuously changing instantaneous location and orientation. In order to provide sufficient bandwidth, successive readings from each external spatial data source should be received and converted with a frequency of the same order as the clock speed (or at least one of the clock speeds) of the controller, typically 3 Hz-12 Hz or higher.

Referring again to FIG. 16, the position error generator next receives information from the spatial database. The information it receives from the database includes: the vehicle's desired position, heading H and instantaneous radius of curvature R. (It will be recalled that this information is originally generated by the task path generator and then entered into the spatial database, based on the user-defined path trajectory); and the vehicle's actual position, heading h and instantaneous radius of curvature r. (This information is based on spatial data progressively received from the external spatial data sources as described above, and typically also on data received through feedback.)

The position error generator then uses this information to calculate an instantaneous "error term" for the vehicle. The "error term" incorporates the vehicle's instantaneous cross-track error, heading error and curvature error (as described above). The error term is then fed into the controller. The controller is shown in greater detail in FIG. 17.

Figure 17:
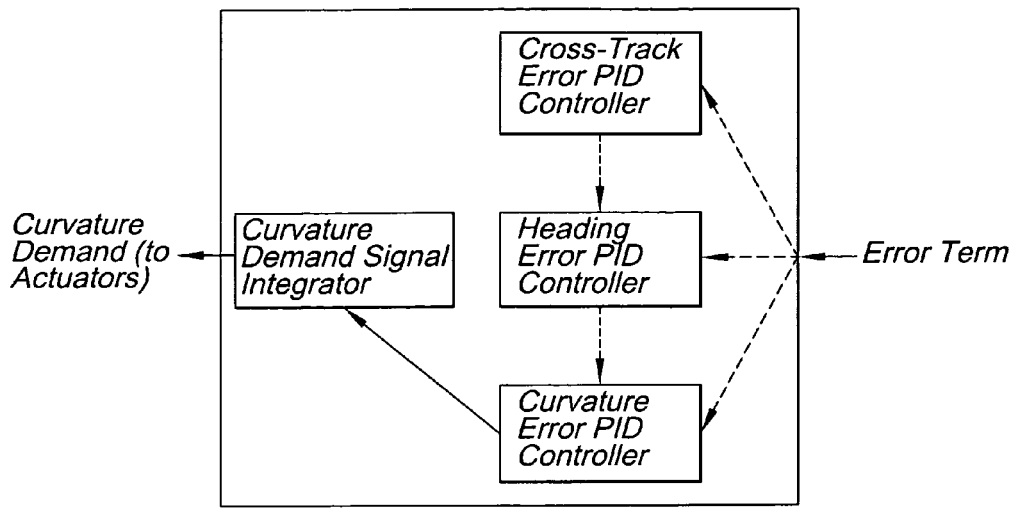
FIG. 17 is a schematic representation of the "controller" block that may be used in representative embodiments such as that shown in FIG. 16.

From FIG. 17 it can be seen that the controller incorporates a cross-track error PID controller, a heading error PID controller and a curvature error PID controller. The PID controllers used with the present invention are of a conventional form that will be well understood by those skilled in this area and need not be described in detail. The output from the cross-track error, heading error and curvature error PID controllers then passes through a curvature demand signal integrator. The output from the PID controllers is therefore integrated in order to generate a curvature demand signal. This curvature demand signal is thus the "control signal" which is amplified by amplifiers (not shown) before proceeding to drive the actuators as required. In other words, the signal obtained by integrating the output from the PID controllers is amplified and sent to the actuators in the form of a curvature demand to change the vehicle's steering angle and hence steer the vehicle back onto the desired path. Finally, the change in vehicle pose, etc., caused by the control driven change in steering angle is registered via the updated information received through the external data sources (GPS etc) and the vehicle's new position, heading and instantaneous radius of curvature are re-entered into the spatial database to complete control system's overall closed loop control structure. It will be noted that the arrows extending from the actuators/steering mechanism to the external data sources in FIG. 16 are dashed rather than solid lines. This is to indicate that, whilst there is no actual control signal or other data flow from the actuators/steering mechanism to the external data sources, there is nevertheless a causal link between the change in vehicle pose, etc., caused by the control driven change in steering angle and the updated information received through the external data sources.

Figure 18:
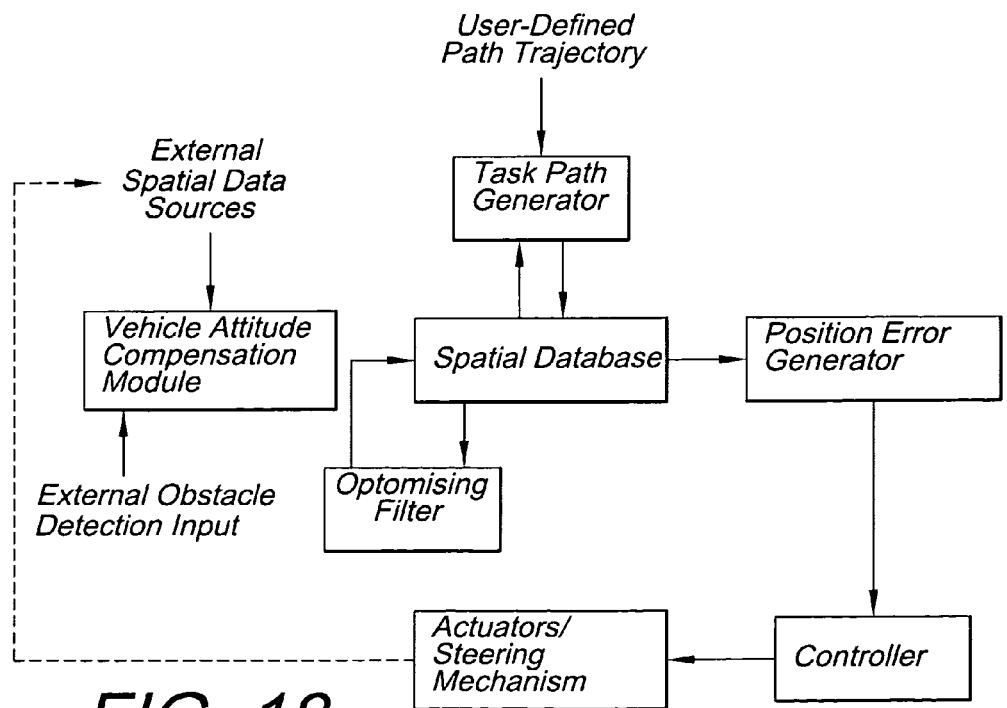
FIG. 18 is a further schematic "block-diagram" representation of an overall control system structure that may be used with alternative representative embodiments of the invention which incorporate additional features not shown in FIG. 16.

In FIG. 18, there is shown a slightly more elaborate embodiment of the control system. The embodiment shown in FIG. 18 is generally the same as that shown in FIG. 16, except that the embodiment in FIG. 18 incorporates an optimizing filter and an external obstacle detection input. The optimizing filter can operate to statistically optimize at least some of the spatial data contained in the spatial data base. Also, the filter will generally operate as an "observer", meaning that it does not form part of the control loop. Rather, the filter will typically reside outside the control loop and it will generally operate by taking data directly from the database and returning optimize data directly into the database, as shown in FIG. 18. More specifically, the filter will take the updated "feedback" data that re-enters the database from the control loop (described above) together with the updated spatial data obtained from the external spatial data sources (after it has been processed by the vehicle attitude compensation module) and it will then use these disparate streams of data to calculate a statistically optimized updated estimate of, for example, the vehicle's instantaneous position, heading and radius of curvature. The filter will typically comprise a Kalman filter.

The external obstacle detection input may comprise any form of vision based, sound based or other obstacle detection means, and the obstacle detection data may be converted by the vehicle attitude compensation module (just like the other sources of external data discussed above) and then fed into the spatial database. Where the control system incorporates obstacle detection, it is then necessary for the task path generator to be able to receive updated information from the spatial database. This is so that if an obstacle is detected on the desired path, an alternative path that avoids the obstacle can be calculated by the task path generator and re-entered into the database. The ability of the task path generator to also receive data from the spatial database is indicated by the additional arrow from the spatial database to the task path generator in FIG. 18.

FIGS. 4-6 graphically represent the operation of the control system. However, it is also useful to consider the way in which the vehicle's parameters and dynamics are represented for the purposes of implementing the control system. Those skilled in the art will recognize that a range of methods may be used for this purpose. However, it is considered that one method is to represent the parameters and dynamics in "state space" form.

In state space representations, the variables or parameters used to mathematically model the motion of the vehicle, or aspects of its operation, are referred to as "states" $x_i$. In the present case, the states may include the vehicle's position (x,y), velocity $$\left(\frac{dx}{dt}, \frac{dy}{dt}\right)$$

heading h, radius of curvature r etc. Hence the states may include $x_i$=x, $$x_2 = y, \ x_3 = h, \ x_4 = \dot{h}, \ x_5 = \frac{dx}{dt} = \frac{dx_1}{dt}, \ x_6 = \frac{dy}{dt} = \frac{dx_2}{dt}.$$

Etc. However, it will be appreciated that the choice of states is never unique, and the meaning and implications of this will be well understood by those skilled in the art.

The values for the individual states at a given time are represented as the individual entries in an n×1 "state vector":

$$\underline{X}(t) = [x_1(t) x_2(t) x_3(t) x_4(t) \ldots x_n(t)]^T$$

where n is the number of states.

In general, the mathematical model used to model the vehicle's motion and aspects of its operation will comprise a series of differential equations. The number of equations will be the same as the number of states. In some cases, the differential equations will be linear in terms of the states, whereas in other situations the equations may be nonlinear in which case they must generally be "linearised" about a point in the "state space". Linearisation techniques that may be used to do this will be well known to those skilled in this area.

Next, by noting that any $j^{th}$ order linear differential equations can be re-written equivalently as a set j first order linear differential equations, the linear (or linearized) equations that represent the model can be expressed using the following "state" equation:

$$\frac{d}{dt}(\underline{X}(t)) = A\underline{X}(t) + B\underline{U}(t) + E\underline{w}(t)$$

Where:
A is an n×n matrix linking the state time derivatives to the states themselves,
$\underline{U}(t)$ is an m×1 matrix containing the external "forcing" inputs in the mathematical model,
B is an n×m matrix linking the state derivatives to the inputs,
m is the number of inputs,
$E\underline{w}(t)$ is a quantity (represented by an n×1 vector) called the "process noise". The process noise represents errors in the model and vehicle dynamics which exist in the actual vehicle but which are not accounted for in the model. As $E\underline{w}(t)$ represents an unknown quantity, its contents are not known. However, for reasons that will be understood by those skilled in this area, in order to allow statistically optimised signal processing and state estimation $E\underline{w}(t)$ is generally assumed to be Gaussian, white, have zero mean and to act directly on the state derivatives. It is also assumed that the process noise element associated with each individual state is uncorrelated with the process noise element of the other states.

The process noise represents errors in the model and vehicle dynamics which exist in the actual vehicle but which are not accounted for in the model. As Ew(t) represents an unknown quantity, its contents are not known. However, for reasons that will be understood by those skilled in this area, in order to allow statistically optimized signal processing and state estimation Ew(t) is generally assumed to be Gaussian, white, have zero mean and to act directly on the state derivatives. It is also assumed that the process noise element associated with each individual state is uncorrelated with the process noise element of the other states.

The quantities that are desired to be known about the vehicle (the real values for which are generally also measured from the vehicle itself, if possible) are the outputs y1 from the model. Each of the outputs generated by the linear (or linearized) model comprises a linear combination of the states $x_i$ and inputs $u_i$, and so the outputs can be defined by the "output" or "measurement" equation:

$$Y(t) = C\underline{X}(t) + D\underline{U}(t) M\underline{v}(t)$$

Where C is a j×n matrix linking the outputs to the states,
D is a j×m matrix linking the outputs to the inputs,
j is the number of outputs, and
$M\underline{v}(t)$ is a quantity (represented by an n×1 vector) called the "measurement noise". The measurement noise represents errors and noise that invariably exist in measurements taken from the actual vehicle. Like Ew(t) above, $M\underline{v}(t)$ is assumed to be Gaussian, white, have zero mean, to act directly on the state derivatives and to be uncorrelated with the process noise or itself.

Next, it will be noted that both the state equation and the measurement equation defined above are continuous functions of time. However, continuous time functions do not often lend themselves to easy digital implementation (such as will generally be required in implementing the present invention) because digital control systems generally operate as recursively repeating algorithms. Therefore, for the purpose of implementing the equations digitally, the continuous time equations may be converted into the following recursive discrete time equations by making the substitutions set out below and noting that (according to the principle of superposition) the overall response of a linear system is the sum of the free (unforced) response of that system and the responses of that system due to forcing/driving inputs. The recursive discrete time equations are:

$$Xk+1 = FXk + GUk+1 + Lwk+1$$

$$Yk+1 = ZXk + JUk+1 + Nvk+1$$

where k+1 is the time step occurring immediately after time step k, Z=C, J=D and N$\underline{v}$ is the discrete time analog of the continuous time measurement noise M$\underline{v}$(t). F is a transition matrix which governs the free response of the system. F is given by:

$$F = e^{A\delta}$$

GU.sub.k+1 is the forced response of the system, i.e. the system's response due to the driving inputs. It is defined by the convolution integral as follows:

$$GUk + 1 = \int_0^{\Delta t} e^{A(\Delta t - \tau)} d\tau$$

Similarly, the quantity Lw.sub.k+1 is the (forced) response of the system due to the random "error" inputs that make up the process noise. Hence, conceptually this quantity may be defined as:

$$Lwk + 1 = \int_0^{\Delta t} e^{A(\Delta t - \tau)d\tau} Ew(tk + 1 + \tau) d\tau$$

However, as noted above, the quantity Ew(t) is not deterministic and so the integral defining Lw.sub.k+1 cannot be performed (even numerically). It is for this reason that it is preferable to use statistical filtering techniques such as a "Kalman Filter" to statistically optimize the states estimated by the mathematical model.

In general, a "Kalman Filter" operates as a "predictor-corrector" algorithm. Hence, the algorithm operates by first using the mathematical model to "predict" the value of each of the states at time step k+1 based on the known inputs at time step k+1 and the known value of the states from the previous time step k. It then "corrects" the predicted value using actual measurements taken from the vehicle at time step k+1 and the optimized statistical properties of the model. In summary, the Kalman Filter comprises the following equations each of which is computed in the following order for each time step:

$$\left. \begin{array}{l} \underline{X}_{k+1|k} = F\underline{X}_{k|k} + G\underline{U}_{k+1} \\ P_{k+1|k} = FP_{k|k}F^T + Q \\ K_{k+1} = P_{k+1|k}Z^T(ZP_{k+1|k}Z^T + R)^{-1} \\ \underline{Y}_{k+1} = Z\underline{X}_{k+1|k} + J\underline{U}_{k+1} \\ \underline{v}_{k+1} = \hat{\underline{Y}}_{k+1} - \underline{Y}_{k+1} \end{array} \right\} \text{predictor}$$

$$\left. \begin{array}{l} \underline{X}_{k+1|k+1} = \underline{X}_{k+1|k} + K_{k+1}\underline{v}_{k+1} \\ P_{k+1|k+1} = (I - K_{k+1}Z)P_{k+1|k} \end{array} \right\} \text{corrector}$$

where the notation k+1|k means the value of the quantity in question at time step k+1 given information from time step k. Similarly, k+1|k+1 means the value of the quantity at time step k+1 given updated information from time step k+1. [0135] P is the co-variance in the difference between the estimated and actual value of X. [0136] Q is the co-variance in the process noise. [0137] K is the "Kalman gain" which is a matrix of computed coefficients used to optimally "correct" the initial state estimate. [0138] R is the co-variance in the measurement noise. [0139] is a vector containing measurement values taken from the actual vehicle.

Figure 19:
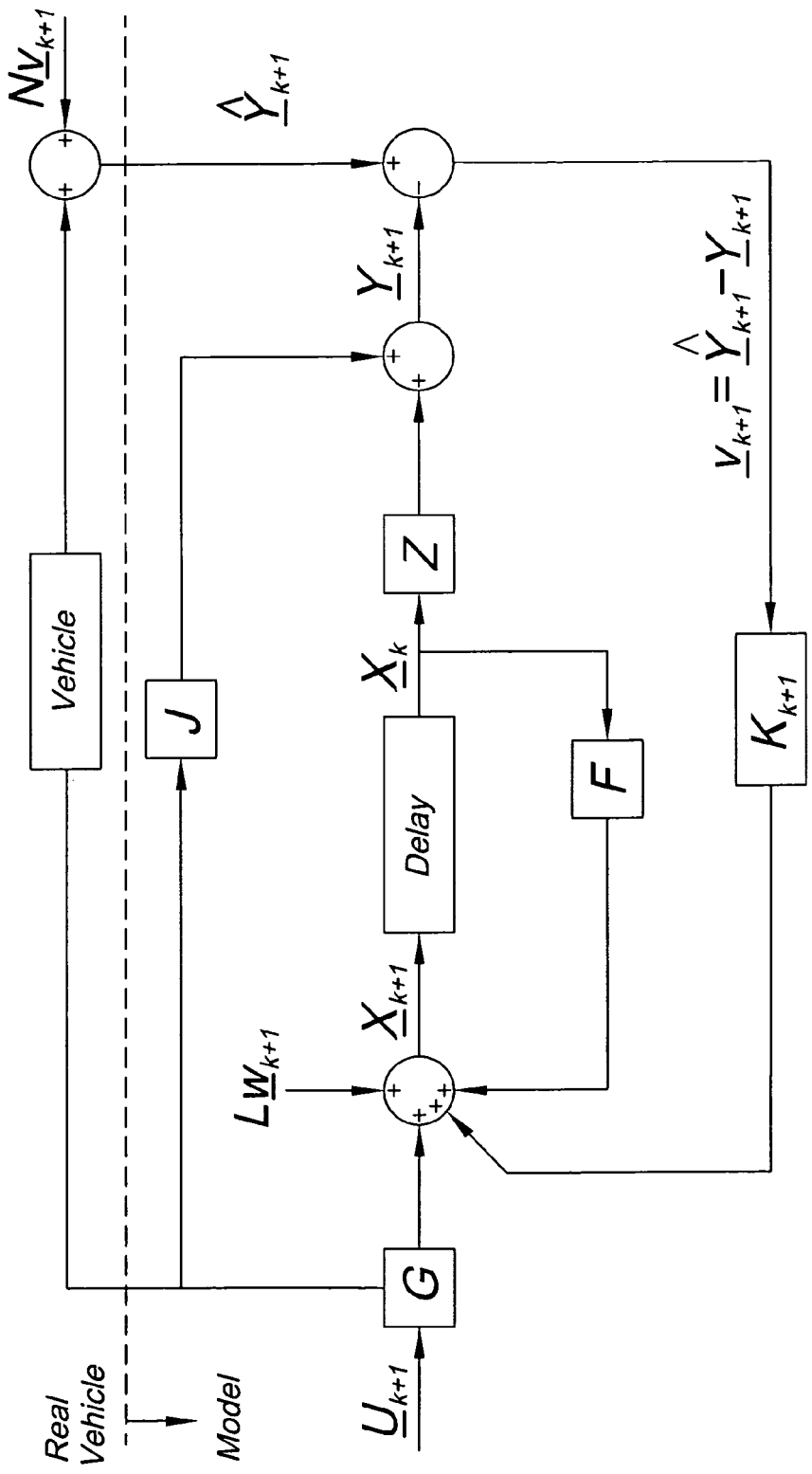
FIG. 19 is a block diagram representation of the state space representation used in the digital implementation of certain aspects of the control system.

The operation of the discrete time state space equations outlined above, including the Kalman gain and the overall feedback closed loop control structure, are represented graphically in FIG. 19.

In relation to the spatial database, it is mentioned above that a wide range of methods are known for arranging data within databases. One commonly used technique is to provide a "hash table". The hash table typically operates as a form of index allowing the computer (in this case the control system CPU) to "look up" a particular piece of data in the database (i.e. to look up the location of that piece of data in memory). In the context of the present invention, pieces of data pertaining to particular locations along the vehicle's path are assigned different hash keys based on the spatial location to which they relate. The hash table then lists a corresponding memory location for each hash key. Thus, the CPU is able to "look up" data pertaining to a particular location by looking up the hash key for that location in the hash table which then gives the corresponding location for the particular piece of data in memory. In order to increase the speed with which these queries can be carried out, the hash keys for different pieces of spatial data can be assigned in such a way that "locality" is maintained. In other words, points which are close to each other in the real world should be given closely related indices in the hash table (i.e. closely related hash keys).

Figure 20:
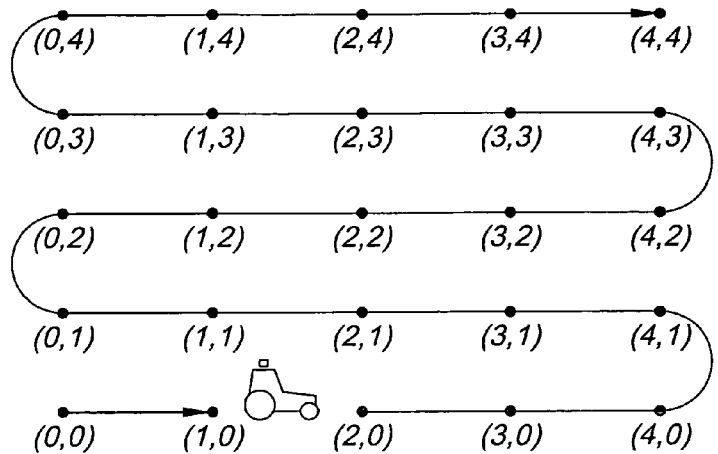
FIG. 20 shows an example trajectory of an agricultural vehicle, and the coordinates corresponding to different points along the trajectory using a simplified integer based coordinate system.

The spatial hash algorithm used to generate hash keys for different spatial locations in representative embodiments of the present invention may be most easily explained by way of a series of examples. To begin, it is useful to consider the hypothetical vehicle path trajectory shown in FIG. 20. In FIG. 20, the successive points which define the path are described by a simplified integer based (X,Y) coordinate system. Hence, in FIG. 20, the vehicle moves in the X direction along the entire length of the first swath from (0,0) to (4,0), before moving up in the Y direction to then move back along the second swath in the opposite direction from (4,1) to (0,1), etc.

As outlined above, in the present invention all data is stored within the spatial database with reference to spatial location. Therefore, it is necessary to assign indices or "hash keys" to each piece of data based on the spatial location to which each said piece of data relates. However, it will be recalled that the hash table must operate by listing the hash key for each particular spatial location together with the corresponding memory location for data pertaining to that spatial location. Therefore, the hash table is inherently one-dimensional, and yet it must be used to link hash keys to corresponding memory allocations for data that inherently pertains to two-dimensional space.

One simple way of overcoming this problem would be to simply assign hash keys to each spatial location based only on, say, the Y coordinate at each location. The hash keys generated in this way for each point on the vehicle path in FIG. 20 are given in Table 1 below.

TABLE 1

Spatial Hash Key Generated Using Only the Y Coordinate

| (X, Y) coordinates | Hash key (hexadecimal) | Hash key (decimal) |
|---|---|---|
| (0, 0) | 0x0 | 0 |
| (1, 0) | 0x0 | 0 |
| (2, 0) | 0x0 | 0 |
| (3, 0) | 0x0 | 0 |
| (4, 0) | 0x0 | 0 |
| (0, 1) | 0x1 | 1 |
| (1, 1) | 0x1 | 1 |
| (2, 1) | 0x1 | 1 |
| (3, 1) | 0x1 | 1 |
| (4, 1) | 0x1 | 1 |
| (0, 2) | 0x2 | 2 |
| (1, 2) | 0x2 | 2 |
| (2, 2) | 0x2 | 2 |
| (3, 2) | 0x2 | 2 |
| (4, 2) | 0x2 | 2 |
| (0, 3) | 0x3 | 3 |
| (1, 3) | 0x3 | 3 |
| (2, 3) | 0x3 | 3 |
| (3, 3) | 0x3 | 3 |
| (4, 3) | 0x3 | 3 |
| (0, 4) | 0x4 | 4 |
| (1, 4) | 0x4 | 4 |
| (2, 4) | 0x4 | 4 |
| (3, 4) | 0x4 | 4 |
| (4, 4) | 0x4 | 4 |

The prefix "0x" indicates that the numbers in question are expressed in hexadecimal format. This is a conventional notation.

Those skilled in the art will recognize that the above method for generating hash keys is far from optimal because there are five distinct spatial locations assigned to each different hash key. Furthermore, in many instances, this method assigns the same hash key to spatial locations which are physically remote from each other. For instance, the point (0,1) is distant from the point (4,1), and yet both locations are assigned the same hash key. An identically ineffective result would be obtained by generating a hash key based on only the X coordinate.

An alternative method would be to generate hash keys by concatenating the X and Y coordinates for each location. The hash keys generated using this method for each point on the vehicle path in FIG. 20 are given in Table 2 below.

TABLE 2

Hash Keys Generated by Concatenating the X and Y Coordinates

| (X, Y) coordinates | Hash key (hexadecimal) | Hash key (decimal) |
|---|---|---|
| (0, 0) | 0x0 | 0 |
| (1, 0) | 0x100 | 256 |
| (2, 0) | 0x200 | 512 |
| (3, 2) | 0x302 | 770 |
| (4, 2) | 0x402 | 1026 |
| (0, 3) | 0x3 | 3 |

In order to understand how the numbers listed in Table 2 above were arrived at, it is necessary to recognize that in the digital implementation of the present control system, all coordinates will be represented in binary. For the purposes of the present example which relates to the simplified integer based coordinate system in FIG. 20, a simplified 8-bit binary representation has been used.

Hence, to illustrate the operation of the spatial hash key algorithm used to generate the numbers in Table 2, consider the point (3,3). Those skilled in the art will understand that the decimal number 3 may be written as 11 in binary notation. Therefore, the location (3,3) may be rewritten in 8-bit binary array notation as (00000011,00000011). Concatenating these binary coordinates then gives the single 16-bit binary hash key 0000001100000011 which can equivalently be written as the hexadecimal number 0x303 or the decimal number 771. The process of converting between decimal, binary and hexadecimal representations should be well known to those skilled in the art and need not be explained.

It will be noted from Table 2 above that concatenating the X and Y coordinates leads to unique hash keys (in this example) for each spatial location. However, the hash keys generated in this way are still somewhat sub-optimal because points which are located close to each other are often assigned vastly differing hash keys. For example, consider the points (0,0) and (1,0). These are adjacent point in the "real world". However, the hash keys assigned to these points using this method (written in decimal notation) are 0 and 256 respectively. In contrast, the point (0,4) is much further away from (0,0) and yet it is assigned the much closer hash key 4. Therefore, this algorithm does not maintain "locality", and an alternative algorithm would be preferable.

Yet a further method for generating hash keys is to use a technique which shall hereinafter be referred to as "bitwise interleaving". As for the previous example, the first step in this technique is to represent the (X,Y) coordinates in binary form. Hence, using the 8-bit binary array representation discussed above, the point (X,Y) may be re-written in 8-bit binary array notation as $(X1X2X3X4X5X6X7\times8, Y1Y2Y3Y4Y5Y6Y7Y8)$. Next, rather than concatenating the X and Y coordinates to arrive at a single 16-bit binary hash key, the successive bits from the X and Y binary coordinates are alternatingly "interleaved" to give the following 16-bit binary hash key $X1Y1X2Y2X3Y3X4Y4\times5Y5X6Y6X7YX8Y8$. The hash keys generated using this method for each point on the vehicle path in FIG. 20 are given in Table 3 below.

TABLE 3

Hash Keys Generated by "Bitwise Interleaving" the X and Y Coordinates (X, Y)

| (X, Y) coordinates | Hash key (hexadecimal) | Hash key (decimal) |
|---|---|---|
| (0, 0) | 0x0 | 0 |
| (1, 0) | 0x2 | 2 |
| (2, 0) | 0x8 | 8 |
| (3, 0) | 0xa | 10 |
| (4, 0) | 0x20 | 32 |
| (0, 1) | 0x1 | 1 |
| (1, 1) | 0x3 | 3 |
| (2, 1) | 0x9 | 9 |
| (3, 1) | 0xb | 11 |
| (4, 1) | 0x21 | 33 |
| (0, 2) | 0x4 | 4 |
| (1, 2) | 0x6 | 6 |
| (2, 2) | 0xc | 12 |
| (3, 2) | 0xe | 14 |
| (4, 2) | 0x24 | 36 |
| (0, 3) | 0x5 | 5 |
| (1, 3) | 0x6 | 7 |
| (2, 3) | 0xd | 13 |

TABLE 3-continued

Hash Keys Generated by "Bitwise Interleaving" the X and Y Coordinates (X, Y)

| (X, Y) coordinates | Hash key (hexadecimal) | Hash key (decimal) |
|---|---|---|
| (3, 3) | 0xf | 15 |
| (4, 3) | 0x25 | 37 |
| (0, 4) | 0x10 | 16 |
| (1, 4) | 0x12 | 18 |
| (2, 4) | 0x18 | 24 |
| (3, 4) | 0x1a | 26 |
| (4, 4) | 0x30 | 48 |

To further illustrate the operation of the spatial hash algorithm used to generate the numbers in Table 3, consider the point (3,4). As noted above, the decimal number 3 may be written as 11 in binary notation. Similarly, decimal number 4 is written as 100 in binary. Therefore, the location (3,4) may be rewritten in 8-bit binary array notation as (00000011, 00000100). Bitwise interleaving these binary coordinates then gives the single 16-bit binary hash key 0000000000011010, which can equivalently be written as the hexadecimal number 0x1a or the decimal number 26.

From Table 3 it will be seen that generating hash keys by "bitwise interleaving" the X and Y coordinates leads to unique hash keys (in this example) for each spatial location. Also, the hash keys generated in this way satisfy the requirement that points which are close together in the real world are assigned closely related hash keys. For example, consider again the points (0,0) and (1,0). The hash keys now assigned to these points by "bitwise interleaving" (when written in decimal notation) are 0 and 2 respectively. Furthermore, the point (0,1) which is also nearby is also assigned the closely related hash key 1. Conversely, points which are separated by a considerable distance in the real world are given considerably differing hash keys, for example, the hash key for (4,3) is 37.

From the example described with reference to Table 3, it can be seen that generating hash keys by "bitwise interleaving" the binary X and Y coordinates preserves "locality". This example therefore conceptually illustrates the operation of the bitwise interleaving spatial hash algorithm that may be used with representative embodiments of the present invention. However, the above example is based on the simplified integer based coordinate system shown in FIG. 20. In order to understand the actual algorithm that may be used in the implementation of the present control system, it is necessary to take into account certain other complexities. These complexities include:

The fact that GPS and other similar systems which describe spatial location typically do so using IEEE double-precision floating-point numbers (not simple integers). For instance, GPS supplies coordinates in the form of (X,Y) coordinates where X corresponds to longitude, and Y corresponds to latitude. Both X and Y are given in units of decimal degrees.

the fact that certain spatial locations have negative coordinate values when described using GPS and other similar coordinate systems. For example, using the WGS84 datum used by current GPS, the coordinates (153.00341,−27.47988) correspond to a location in Queensland, Australia (the negative latitude value indicates southern hemisphere).

Complexities inherent in representing numbers in accordance with the IEEE double-precision floating-point numbers standard.

Figure 21:
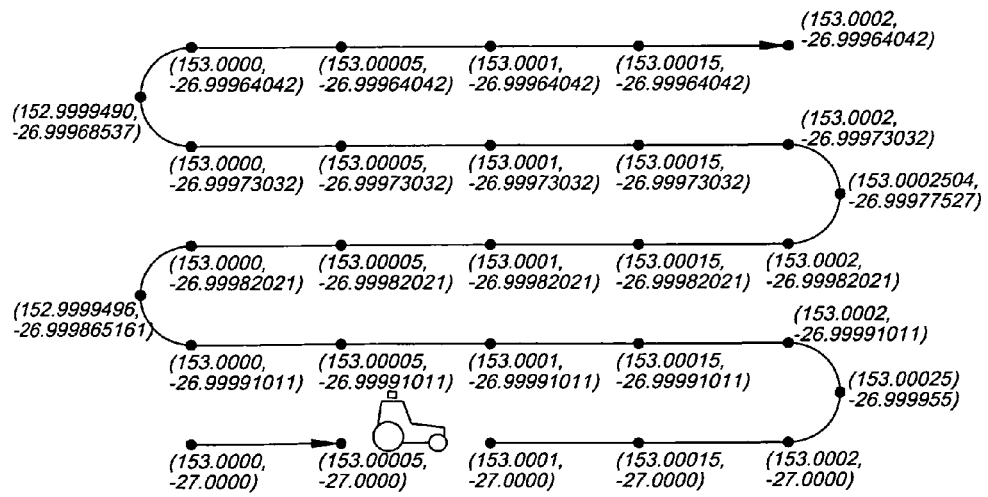
FIG. 21 shows a similar example trajectory of an agricultural vehicle to that shown in FIG. 20, except that the coordinate system is similar in format to the WGS84 coordinate used by current GPS.

FIG. 21 shows an example vehicle path similar to that shown in FIG. 20, except that the coordinates used to describe the points along the path in FIG. 21 correspond to a "realistic" coordinate system such as that used by current GPS. In order to understand the implementation of the bitwise interleaving spatial hash algorithm when applied to these realistic coordinates, it is necessary to first appreciate certain aspects regarding the way numbers are represented using the standard IEEE double-precision floating-point number format.

Figure 22:
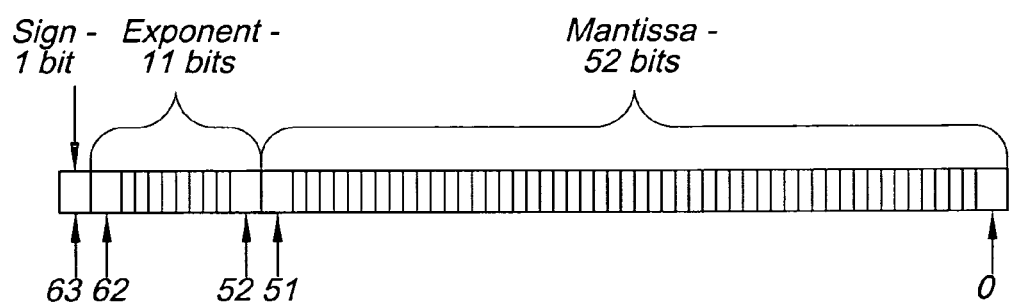
FIG. 22 illustrates the way in which numbers are represented in the IEEE 754 standard double-precision floating-point format.

A double-precision floating-point number represented in accordance with the IEEE 754 standard comprises a string of 64 binary characters (64 bits) as shown in FIG. 22. The number is represented in three parts, namely the sign, the exponent and the mantissa. The sign comprises one bit. If the sign bit is 1 then the number is negative, and conversely if the sign bit is 0 then the number is positive. The exponent comprises eleven binary characters, and hence can range from 00000000000 to 11111111111. However, because of the need to represent numbers that are both greater and smaller than one, it is necessary to be able to represent both large positive and large negative values for the exponent. However, it is not desirable to use one of the exponent bits to represent the sign of the exponent because this would leave fewer bits available to represent the exponent's actual value and would therefore greatly limit the size of the numbers that could be represented. Therefore, in the IEEE standard 64 bit format, the true value of the exponent is given by the binary number actually written by the eleven exponent bits minus an implied exponent bias.

Hence, actual exponent value=written exponent value−exponent bias.

The exponent bias is 0x3ff=1023. Consequently, the maximum true exponent value that can be represented (written in decimal notation) is 1023, and the minimum true exponent value that can be represented is −1022.

Finally, the remaining 52 bits form the mantissa. However, as all non-zero numbers must necessarily have a leading "1" when written in binary notation, an implicit "1" followed by a binary point is assumed to exist at the front of the mantissa. In other words, the leading "1" and the binary point which must necessarily exist for all non-zero binary numbers is simply omitted from the actual written mantissa in the IEEE 64-bit standard format. This is so that an additional bit may be used to represent the number with greater precision. However, when interpreting numbers which are represented in accordance with the IEEE standard, it is important to remember that this leading "1" and the binary point implicitly exist even though they are not written.

Bearing in mind these issues, it is possible to understand the actual spatial hash algorithm used in representative implementations of the present control system. A "worked" example illustrating the operation of the spatial hash algorithm to generate a hash key based on the coordinate (153.0000°, −27.0000° is given in the form of a flow diagram in FIG. 23. The points are initially expressed in terms of decimal degrees as this is the format in which they are delivered from, for example, GPS.

Figure 23:
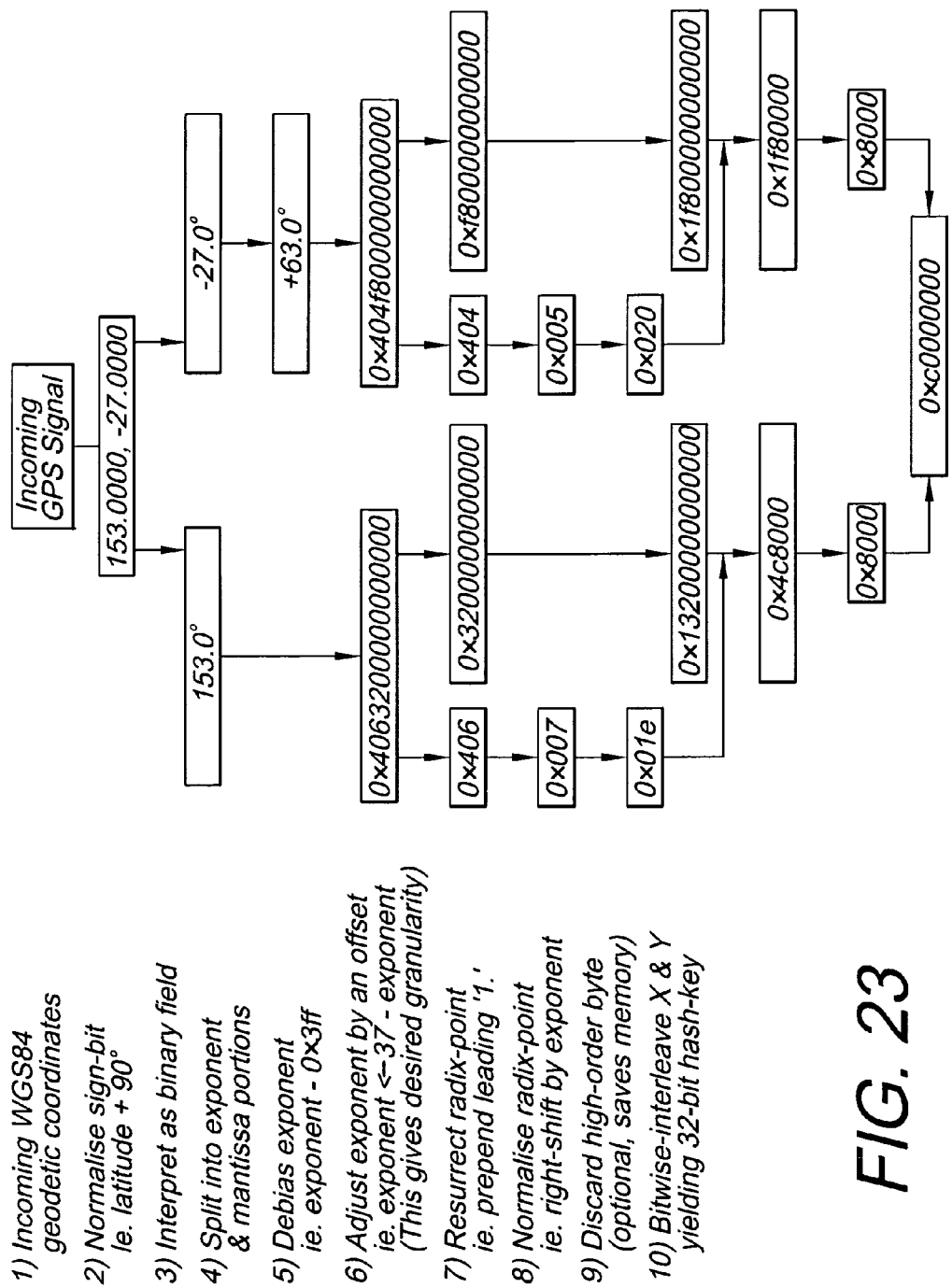
FIG. 23 is a "flow-diagram" illustrating the way a particularly preferred spatial hash algorithm may be used to generate hash keys for the coordinates in FIG. 21.

From FIG. 23 it can be seen that in order to implement the algorithm the X and Y coordinates are separated. The next step is to "normalise" the signs of the respective coordinates (in this case only the Y coordinate needs to be normalized). The reason for normalising the signs of the coordinate is because, when calculating a spatial hash key, it is more convenient to eliminate negative sign bits from the coordinates. In the case of the latitude coordinate, those skilled in this area will recognize that latitude is conventionally written as a number in the range (−90°≤latitude≤90°. Therefore, by simply adding 90° to the value of the latitude coordinate, the spatial hash algorithm can operate with values in the equivalent "un-signed" or "normalised" latitude range (0°≤latitude≤180°). Those skilled in the art will appreciate that the longitude coordinates can also be normalised to fall within the range (0°≤longitude≤360.degree.), although that is not necessary in this example.

After normalising the coordinates, the next step is to convert the respective coordinates from their representations in decimal degrees into binary IEEE double-precision floating-point number format. This is shown as step 3) in FIG. 23. However, it will be noted that the binary coordinate representations (and all other numbers which are generated or used by the algorithm in binary form) have been written in the alternative hexadecimal notation for ease of reference and to save space in FIG. 23.

Next, the binary representations of the two coordinates are split into their respective exponent (11 bits) and mantissa (52 bits) portions. This is step 4) in FIG. 23. Then, in order to determine the correct ("true") value of the exponent, the exponent for each of the coordinate is "de-biased" by subtracting the implicit exponent bias (0x3ff=1023) as described above. This is step 5).

After de-biasing the exponents, the resulting exponents are then adjusted by a selected offset. The size of the offset is selected depending on the desired "granularity" of the resulting fix-point number. In the particular example shown in step 6) of FIG. 23, the offset is 37, however those skilled in the art will appreciate this number can be varied to suit.

After adjusting the exponent, the next step is to "resurrect" the leading "1" and the binary point which implicitly exist in the mantissa but which are left off when the mantissa is actually written (see above). Hence, the leading "1" and the binary point are simply prepended to the mantissa of each of the coordinates. This is step 7) in FIG. 23.

The mantissa for each coordinate is then right-shifted by the number of bits in the corresponding exponent. The exponents for each coordinate are then prepended to their corresponding mantissas forming a single character string for each coordinate. There is then an optional step of discarding the high-order byte for each of the two bit fields. This may be done simply to save memory if required, but is not necessary. Finally, the resultant bit fields for each coordinate are bitwise interleaved to obtain a single hash key corresponding to the original coordinates. In the example shown in FIG. 23, the resultant hash key is 32-bits in length. However, the length of the resultant hash key may vary depending on, for example whether the high-order byte is discarded, etc.

Those skilled in the art will recognize that various other alterations and modifications may be made to the particular embodiments, aspects and features of the invention described without departing from the spirit and scope of the invention may be made to the particular embodiments, aspects and features of the invention described without departing from the spirit and scope of the invention.

Having thus described the invention, what is claimed as new and desired to be secured by Letters Patent is:

1. A system for controlling a vehicle, the vehicle including an automatic steering system and roll, pitch and yaw axes, and the control system comprising:
   a spatial database containing spatial data corresponding to GPS-defined positions in the region;
   a controller mounted on said vehicle and adapted for computing guidance signals, to receive spatial data from the spatial database at control speed, and to control the steering of the vehicle;
   a guidance subsystem mounted on said vehicle and connected to said controller, said guidance subsystem being adapted for receiving said guidance signals from said controller and utilizing said guidance signals for guiding said vehicle;
   external spatial data sources mounted on said vehicle, comprising at least an optical movement sensor subsystem adapted for optically sensing movement of said vehicle relative to a surface over which said vehicle is traveling;
   said optical movement sensor subsystem including an optical movement sensor connected to said controller and adapted for providing optically-sensed vehicle movement signals thereto corresponding to optically-sensed relative vehicle movement;
   said optical movement sensor subsystem including an optical movement sensor and an optimal estimator providing a statistically optimal estimate of the position and attitude information received from the optical movement sensor;
   said optimal estimator including algorithms that receive the position and attitude information from the optical movement sensor and converts said information into a calculated or determined position and attitude of said vehicle producing a statistically optimal estimate of the calculated or determined position and attitude of said vehicle;
   said controller being adapted for computing said guidance signals utilizing said vehicle movement signals;
   the controller correlating images from said optical movement sensor subsystem to obtain data relating to the vehicle's motion;
   a vehicle reference point located at an intersection of the vehicle roll, pitch and yaw axes; and
   the spatial database being adapted to receive updated spatial data from the controller and the external spatial data sources as the vehicle traverses the region.

2. The system for controlling a vehicle according to claim 1, further comprising:
   a global navigation satellite system (GNSS) positioning subsystem mounted on said vehicle and adapted for providing GNSS-derived position signals to said controller;
   said controller using said GNSS-derived position signals for computing said guidance signals;
   said GNSS positioning subsystem including a pair of antennas mounted on said vehicle; and
   said antennas receiving GNSS ranging signals corresponding to their respective geo-reference locations.

3. The system for controlling a vehicle according to claim 2, further comprising:
   said processor being adapted for computing an attitude of said vehicle using ranging differences between the GNSS signals received by said antennas; and
   said GNSS antennas being mounted on said vehicle in transversely-spaced relation.

4. The system for controlling a vehicle according to claim 3, further comprising:
   said vehicle including a motive component and an implement connected to said motive component;
   a GNSS antenna mounted on said implement and connected to said GNSS receiver; and
   said guidance subsystem being adapted for automatically steering said vehicle utilizing said positioning signals to accommodate an offset between said tractor and implement and correct relative positioning of said tractor and implement to maintain said implement on a guide path.

5. The system for controlling a vehicle according to claim 4, further comprising:

said guidance subsystem including an hydraulic steering valve block connected to said controller and to a steering mechanism of said vehicle; and said guidance subsystem including a graphic user interface (GUI) adapted for displaying a guide path of said vehicle.

6. The system for controlling a vehicle according to claim 5, further comprising:
a GNSS base station including a radio transmitter and a radio receiver;
said vehicle including an RF receiver adapted to receive RF transmissions from said base station; and
a real-time kinematic (RTK) correction subsystem using carrier phase satellite transmissions with said vehicle in motion.

7. The system for controlling a vehicle according to claim 1 wherein said optical movement sensor subsystem includes:
a pair of said optical movement sensors fixedly mounted in spaced relation on said vehicle.

8. The system for controlling a vehicle according to claim 1, wherein said external spatial data sources mounted on the vehicle further comprise:
a GNSS system including an antenna and a receiver;
an inertial navigation system (INS) including a gyroscope and an accelerometer; and
a tilt sensor.

9. A control system as claimed in claim 8, wherein the controller uses the GPS system, the inertial navigation system, the gyroscope, the accelerometer and the tilt sensor to generate a control signal for controlling the vehicle.

10. A system for controlling an agricultural vehicle, the vehicle including an automatic steering system and roll, pitch and yaw axes, and the control system comprising:
a spatial database containing spatial data corresponding to GPS-defined positions in the region;
a controller mounted on said vehicle and adapted for computing guidance signals, to receive spatial data from the spatial database at control speed, and to control the steering of the vehicle;
a guidance subsystem mounted on said vehicle and connected to said controller, said guidance subsystem being adapted for receiving said guidance signals from said controller and utilizing said guidance signals for guiding said vehicle;
external spatial data sources mounted on said vehicle, comprising at least an optical movement sensor subsystem adapted for optically sensing movement of said vehicle relative to a surface over which said vehicle is traveling;
said optical movement sensor subsystem including an optical movement sensor connected to said controller and adapted for providing optically-sensed vehicle movement signals thereto corresponding to optically-sensed relative vehicle movement;
said optical movement sensor subsystem including an optical movement sensor and an optimal estimator providing a statistically optimal estimate of the position and attitude information received from the optical movement sensor;
said optimal estimator including algorithms that receive the position and attitude information from the optical movement sensor and converts said information into a calculated or determined position and attitude of said vehicle producing a statistically optimal estimate of the calculated or determined position and attitude of said vehicle;
said controller being adapted for computing said guidance signals utilizing said vehicle movement signals;
the controller correlating images from said optical movement sensor subsystem to obtain data relating to the vehicle's motion;
a vehicle reference point located at an intersection of the vehicle roll, pitch and yaw axes;
the spatial database being adapted to receive updated spatial data from the controller and the external spatial data sources as the vehicle traverses the region;
a global navigation satellite system (GNSS) positioning subsystem mounted on said vehicle and adapted for providing GNSS-derived position signals to said controller;
said controller using said GNSS-derived position signals for computing said guidance signals;
said GNSS positioning subsystem including a pair of antennas mounted on said vehicle;
said antennas receiving GNSS ranging signals corresponding to their respective geo-reference locations;
said processor being adapted for computing an attitude of said vehicle using ranging differences between the GNSS signals received by said antennas;
said GNSS antennas being mounted on said vehicle in transversely-spaced relation;
said vehicle including a motive component and an implement connected to said motive component;
a GNSS antenna mounted on said implement and connected to said GNSS receiver;
said guidance subsystem being adapted for automatically steering said vehicle utilizing said positioning signals to accommodate an offset between said tractor and implement and correct relative positioning of said tractor and implement to maintain said implement on a guide path;
said guidance subsystem including an hydraulic steering valve block connected to said controller and to a steering mechanism of said vehicle;
said guidance subsystem including a graphic user interface (GUI) adapted for displaying a guide path of said vehicle;
a GNSS base station including a radio transmitter and a radio receiver;
said vehicle including an RF receiver adapted to receive RF transmissions from said base station; and
a real-time kinematic (RTK) correction subsystem using carrier phase satellite transmissions with said vehicle in motion.

11. A method for controlling a vehicle within a region to be traversed, the vehicle including an automatic steering system and roll, pitch and yaw axes, the method comprising the steps:
providing a spatial database;
populating said database with spatial data corresponding to GPS-defined positions in the region;
providing a position error generator;
providing a controller;
mounting said controller to said vehicle;
traversing the region with said vehicle;
receiving spatial data with said controller from the spatial database at control speed;
controlling the steering of the vehicle with the controller as the vehicle traverses the region;
providing the controller with a task path generator;
receiving data from the spatial database with the controller and controller task path generator;
providing the controller with a vehicle attitude compensation module;
mounting external spatial data sources, including at least an optical movement sensor subsystem, on said vehicle and optically sensing movement of said vehicle relative to a surface over which said vehicle is traveling;

said optical movement sensor subsystem including an optimal estimator providing a statistically optimal estimate of the position and attitude information received from the optical movement sensor;

providing said optimal estimator with algorithms that receive the position and attitude information from the optical movement sensor and convert said information into a calculated or determined position and attitude of said vehicle producing a statistically optimal estimate of the calculated or determined position and attitude of said vehicle;

populating said spatial database with ground images from said optical movement sensor subsystem;

inputting said ground images to the controller;

correlating the images with said controller to obtain data relating to the vehicle's motion;

designating and locating a vehicle reference point at an intersection of the vehicle roll, pitch, and yaw axes; and updating said spatial database with spatial data from the controller and said external spatial data sources as the vehicle traverses the region.

12. The method for controlling a vehicle according to claim 11, further comprising the steps:

providing a global navigation satellite system (GNSS) positioning subsystem mounted on said vehicle and providing GNSS-derived position signals to said controller;

providing said GNSS positioning subsystem with a pair of antennas mounted on said vehicle;

receiving with said antennas GNSS ranging signals corresponding to their respective geo-reference locations; and computing with said processor an attitude of said vehicle using ranging differences between the GNSS signals received by said antennas.

13. The method for controlling a vehicle according to claim 12, further comprising the steps:

mounting said GNSS antennas on said vehicle in transversely-spaced relation.

14. The method for controlling a vehicle according to claim 12, further comprising the steps:

providing said vehicle with a motive component and an implement connected to said motive component;

mounting a GNSS antenna on said implement and connecting said implement-mounted GNSS antennas to said GNSS receiver; and said guidance subsystem automatically steering said vehicle utilizing said positioning signals to accommodate an offset between said tractor and said implement and to maintain said implement on a guide path.

15. The method according to claim 11, which includes the additional steps of:

providing said optical movement sensor subsystem with a pair of optical movement sensors; and fixedly mounting said optical movement sensors in spaced relation on said vehicle.

16. The method for controlling a vehicle according to claim 11, wherein said external spatial data sources mounted on the vehicle further comprise:

a GNSS system including an antenna and a receiver;

an inertial navigation system (INS) including a gyroscope and an accelerometer; and a tilt sensor.

17. The method for controlling a vehicle according to claim 16, wherein the controller uses the GPS system, the inertial navigation system, the gyroscope, the accelerometer and the tilt sensor to generate a control signal for controlling the vehicle.

* * * * *